(12) United States Patent
Wade et al.

(10) Patent No.: US 9,046,365 B2
(45) Date of Patent: Jun. 2, 2015

(54) ELECTRONIC DEVICES WITH MAGNETIC FIELD COMPENSATING CONDUCTIVE TRACES

(75) Inventors: Jeremy L. Wade, San Francisco, CA (US); Michael Eng, San Jose, CA (US); Ryan J. Garrone, Wildwood, MO (US); Mark Brown, San Jose, CA (US)

(73) Assignee: Apple Inc., Cupertino, CA (US)

( * ) Notice: Subject to any disclaimer, the term of this patent is extended or adjusted under 35 U.S.C. 154(b) by 530 days.

(21) Appl. No.: 13/283,438

(22) Filed: Oct. 27, 2011

(65) Prior Publication Data

US 2013/0104410 A1 May 2, 2013

(51) Int. Cl.
*G01C 17/28* (2006.01)
*G01C 21/00* (2006.01)

(52) U.S. Cl.
CPC ............... *G01C 17/28* (2013.01); *G01C 21/00* (2013.01)

(58) Field of Classification Search
CPC ........... G01C 21/3664; G01C 21/3688; G01C 17/00; G01C 17/28; G01C 21/00
USPC ..................... 33/356, 357, 355 R, 355 D, 361
See application file for complete search history.

(56) References Cited

U.S. PATENT DOCUMENTS

| | | | |
|---|---|---|---|
| 4,517,497 A | | 5/1985 | Malone |
| 4,729,172 A | * | 3/1988 | Alberter et al. ................. 33/356 |
| 5,802,727 A | * | 9/1998 | Blank et al. ..................... 33/361 |
| 5,850,624 A | * | 12/1998 | Gard et al. ....................... 33/356 |
| 5,912,597 A | * | 6/1999 | Inagawa et al. ................... 333/1 |
| 6,427,349 B1 | | 8/2002 | Blank et al. |
| 6,539,639 B2 | * | 4/2003 | Smith ............................. 33/356 |
| 6,918,186 B2 | * | 7/2005 | Ash et al. ........................ 33/313 |
| 7,168,177 B2 | * | 1/2007 | Kwon et al. ..................... 33/361 |
| 7,210,236 B2 | * | 5/2007 | Sato et al ........................ 33/356 |
| 7,324,906 B2 | * | 1/2008 | Sato et al. ....................... 33/356 |
| 7,360,932 B2 | * | 4/2008 | Uken et al. ..................... 362/494 |
| 7,379,814 B2 | * | 5/2008 | Ockerse et al. ................. 33/361 |
| 7,474,977 B2 | * | 1/2009 | Sato et al. ....................... 33/356 |
| 7,606,676 B2 | * | 10/2009 | Sato et al. ....................... 33/356 |
| 7,895,759 B2 | * | 3/2011 | Hu ................................. 33/361 |
| 7,921,572 B2 | * | 4/2011 | Mayor et al. ................... 33/356 |
| 7,950,160 B2 | * | 5/2011 | Ueno et al. ..................... 33/356 |
| 8,239,153 B2 | * | 8/2012 | Piemonte et al. ............... 33/326 |
| 8,401,571 B2 | * | 3/2013 | Naukkarinen et al. ........ 455/457 |
| 8,494,799 B2 | * | 7/2013 | Piemonte et al. ............... 33/326 |
| 2005/0022402 A1 | * | 2/2005 | Ash et al. ........................ 33/321 |
| 2005/0264891 A1 | * | 12/2005 | Uken et al. ..................... 359/606 |
| 2005/0283988 A1 | * | 12/2005 | Sato et al. ....................... 33/356 |

(Continued)

*Primary Examiner* — Yaritza Guadalupe-McCall
(74) *Attorney, Agent, or Firm* — Treyz Law Group; Kendall P. Woodruff

(57) ABSTRACT

Electronic devices may be provided with compasses for detecting the Earth's magnetic field. Electronic devices may be provided with electronic components that generate interfering magnetic fields for the compass. Electronic components may be coupled between a power supply line and a power return line on a printed circuit. The power return line may be configured to generate a compensating magnetic field to counteract the interfering magnetic fields. The power return line may be formed parallel to the power supply line. The power supply line may have multiple branches equidistant from the compass. The power return line may have a portion closer to the compass than the power supply line and the electronic component. The power return line may have multiple branches, may be provided with resistors on each branch and may include a portion of a circular loop the runs around the compass on the printed circuit board.

21 Claims, 17 Drawing Sheets

(56) References Cited

U.S. PATENT DOCUMENTS

| | | |
|---|---|---|
| 2006/0021238 A1* | 2/2006 | Sato et al. .................. 33/356 |
| 2006/0052132 A1* | 3/2006 | Naukkarinen et al. ..... 455/556.1 |
| 2006/0090359 A1* | 5/2006 | Bork .......................... 33/361 |
| 2007/0288166 A1* | 12/2007 | Ockerse et al. ............. 33/361 |
| 2009/0132198 A1* | 5/2009 | Ito et al. .................... 33/356 |
| 2010/0307015 A1* | 12/2010 | Mayor et al. ............... 33/356 |
| 2010/0312510 A1* | 12/2010 | Piemonte et al. ........... 33/303 |
| 2010/0313434 A1* | 12/2010 | Hu ............................. 33/361 |
| 2011/0090244 A1* | 4/2011 | Pantfoerder ................ 33/355 R |
| 2011/0106474 A1 | 5/2011 | Kulik et al. |
| 2012/0176277 A1* | 7/2012 | Malek et al. ............... 33/333 |
| 2012/0283977 A1* | 11/2012 | Piemonte et al. ........... 33/303 |
| 2013/0057571 A1* | 3/2013 | Harris ........................ 345/619 |
| 2013/0085698 A1* | 4/2013 | Wade et al. ................ 702/92 |
| 2013/0104410 A1* | 5/2013 | Wade et al. ................ 33/361 |
| 2013/0234926 A1* | 9/2013 | Rauber ....................... 345/156 |
| 2013/0286226 A1* | 10/2013 | Baum et al. ................ 348/207.1 |

\* cited by examiner

ELECTRONIC DEVICES WITH MAGNETIC FIELD COMPENSATING CONDUCTIVE TRACES

BACKGROUND

This relates generally to electronic devices and, more particularly, to electronic devices with compasses.

Electronic devices such as portable computers are often provided with compasses and other electronic components. For example, a Global Positioning System (GPS) device or cellular telephone may have a compass for orienting maps displayed to a user on an associated device display.

Other electronic components in an electronic device with a compass often generate magnetic fields when the other electronic components are turned on and off or during operation of the other electronic components. For example, electric current is often supplied to an electronic component when the electronic component is operated. The electric current flowing through a power supply line that provides the electric current to the electronic component (or flowing through the electronic component itself) often generates magnetic fields. These magnetic fields can interfere with the proper operation of the compass.

In the presence of interfering magnetic fields from other components in the electronic device, a compass may provide compass data that is in error by as much as several angular degrees. Errors of this type may be exaggerated when a compass is in close proximity to an electronic component that produces an interfering magnetic field. It is therefore difficult to provide accurate compass data, particularly in compact electronic devices in which compasses must be placed in close proximity to other electronic components or power supply lines that deliver electric current to the electronic components.

It would therefore be desirable to be able to provide electronic devices with improved compasses.

SUMMARY

Electronic devices may be provided with compasses and other electronic components. A compass may include a magnetic sensor such as a magnetometer for sensing the Earth's magnetic field. Magnetometer data may be gathered and processed by compass interface circuitry or other control or processing circuitry associated with the electronic device. Magnetometers may be implemented using anisotropic magnetoresistance (AMR) sensors.

An electronic device may be configured to simultaneously operate the compass and one or more other electronic components such as cameras, auto-focus lenses, flashlights, camera flashes, displays, proximity sensors, display backlights, central processing units, GPS circuitry, accelerometers, gyroscopes, headphones, speakers, and vibrators. For example, processing circuitry may be used to run software on the electronic device such as search applications that display continuous image frames on a display with location information (obtained using the compass) overlaid on the display.

In this type of application, a camera, camera light, camera auto-focus mechanism, control circuitry and other components may be operated in combination with the compass. Electronic component and power supply traces associated with these components may generate interfering magnetic fields that interfere with compass sensing of the Earth's magnetic field.

Conductive lines such as power return lines on a printed circuit board may be formed near other conductive lines such as power supply lines or near the compass. Conductive lines such as power supply lines and power return lines may be formed from conductive metal traces on the printed circuit board.

A power return line may generate a compensating magnetic field in the vicinity of the compass that substantially cancels the interfering magnetic field generated by the power supply line or by the electronic component. A compensating magnetic field may, for example, have a substantially equal magnitude and opposite direction to an interfering magnetic field. Because magnetic field strength is a function of distance from the magnetic field source, power return lines may be routed closer to the compass than the magnetic field generating electronic component.

Power return lines may be formed parallel to power supply traces on a common layer of a printed circuit board with the compass or on another layer of the printed circuit board. Power return lines may be formed along otherwise unorthodox paths in order to route the power return lines near the compass. For example, a power return line that has an available optimally short route to a ground conductor may be routed along a path to the ground conductor that is longer than the optimally short path.

Power return lines may form a portion of a circular loop that runs around a compass on a surface of a printed circuit board. Power return lines may include one or more branches each having resistors that control the amount of current that flows through each branch. If desired, power supply lines may include multiple branches on opposing sides of the compass on the printed circuit board in order to generate compensating magnetic fields.

Further features of the invention, its nature and various advantages will be more apparent from the accompanying drawings and the following detailed description.

DETAILED DESCRIPTION

Electronic devices may be provided with compasses and other electronic components. The compass may include a magnetic sensor such as a magnetometer and compass interface circuitry. The compass interface circuitry may be configured to convert raw magnetometer data into directional compass data (also called compass data). An electronic device may be provided other electronic components and power supply lines that carry electric current to the other electronic components that generate interfering magnetic fields that interfere with the compass.

An electronic device may be provided with power return traces that carry return current from the other electronic components. Power return traces may be formed on a common printed circuit board with power supply lines and the compass. Power return traces may be formed on a common surface of the printed circuit board with the compass or on an opposing surface of the printed circuit board.

Power return traces may be configured to generate compensating magnetic fields that nearly or completely cancel the interfering magnetic fields in the vicinity of the compass.

Other electronic components may include cameras, speakers, auto-focus lens mechanisms, camera flashes, Light Emitting Diodes (LEDs), processing circuitry such as central processing units, memory or other integrated circuits, Global Positioning System (GPS) circuitry, display circuitry, light-emitting display circuitry, display backlights, headphones, batteries, vibrators, actuators or other components.

Other electronic components may have corresponding power lines (e.g., wires, conductive traces on a printed circuit board, etc.) that supply power to the electronic components. Power return traces may be routed near power supply lines, near the compass, around the compass or may be otherwise routed to generate suitable compensating magnetic fields. Power return traces and power supply lines may be provided with variable or fixed strength resistors for adjusting an electric current in the power supply line and the power return trace to generate nearly equal and opposite interfering and compensating magnetic fields in the vicinity of the compass.

Figure 1:
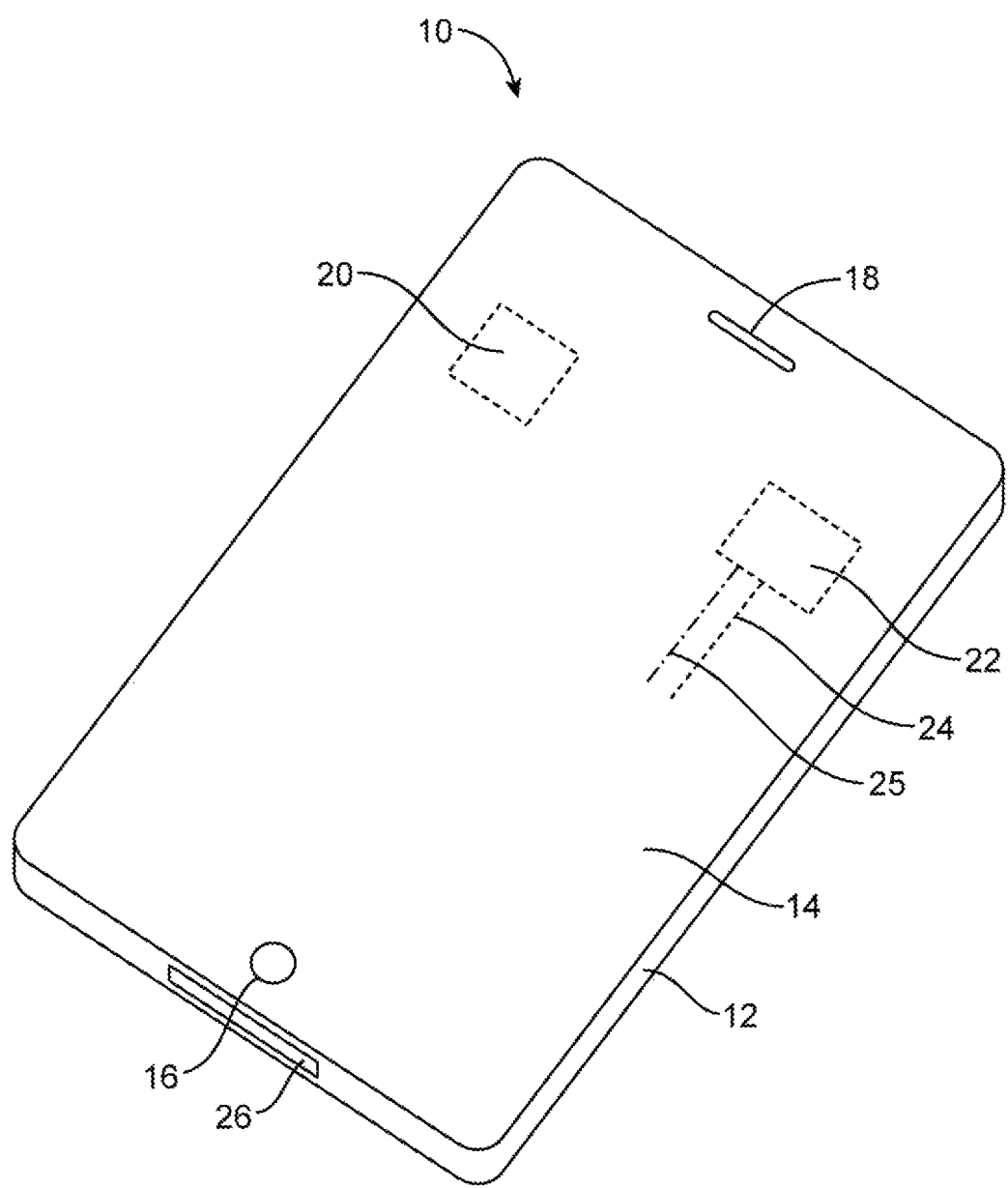
FIG. 1 is a perspective front view of an illustrative electronic device having a compass in accordance with an embodiment of the present invention.

An illustrative electronic device of the type that may be provided with one or more magnetic field compensating power return traces is shown in FIG. 1. Electronic device 10 of FIG. 1 may be a cellular telephone, media player, computer, handheld device, portable computer, tablet computer, Global Positioning System device, camera, gaming device, or other electronic equipment.

As shown in FIG. 1, device 10 may have a housing such as housing 12. Housing 12 maybe formed from plastic, metal, carbon fiber composite material, other composites, glass, ceramics, other materials, or combinations of these materials. Housing 12 may be formed using a unibody construction in which housing 12 is substantially formed from a single structure (e.g., machined or cast metal, plastic, etc.) or may be formed from multiple pieces of material.

For example, housing 12 may include front and rear planar housing structures. The front planar housing structure may be a display cover layer for a display such as display 14. The display cover layer may be formed from glass and may sometimes be referred to as cover glass or display cover glass. The display cover layer may also be formed from other transparent materials such as plastic.

Device 10 may have input-output devices such as input-output ports, speakers, microphones, displays, status indicator lights, touch screens, buttons, proximity sensors, wireless circuitry, accelerometers, ambient light sensors, touch pads, and other devices for accepting input from a user or the surrounding environment of device 10 and/or for providing output to a user of device 10.

As shown in the illustrative configuration of FIG. 1, device 10 may, as an example, have one or more buttons 16 which may be used to gather user input. Buttons 16 may be based on dome switches or other switch circuitry. Buttons 16 may include button members that form push buttons (e.g., momentary buttons), slider switches, rocker switches, etc. Additional buttons such as buttons 16, additional data ports such as port 26, and additional input-output components such as speaker 18 may be provided in device 10 if desired. The example of FIG. 1 is merely illustrative.

Device 10 may have a flexible or rigid display such as display 14. Display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array. Other types of flexible display pixel arrays may also be formed (e.g., electronic ink displays, etc.). This is, however, merely illustrative. Display 14 may be formed using any suitable display technology such as liquid crystal display (LCD) technology or other display technology.

In addition to functional display layers (i.e., the display array and the optional touch sensor array), display 14 may include one or more structural layers. For example, display 14 may be covered with a flexible or rigid cover layer and/or may be mounted on a support structure (e.g., a rigid support In configurations for display 14 in which the flexible layers are covered by a rigid cover glass layer or other rigid cover layer, the rigid layer may be provided with one or more openings and the electronic components may be mounted under the openings. For example, a rigid cover layer may have openings such as a circular openings for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

As shown in FIG. 1, device 10 may be provided with one or more internal magnetic sensitive devices such as compass 20. Compass 20 may include a magnetic sensor such as a magnetometer (e.g., an anisotropic magnetoresistance (AMR) sensor or other magnetometer) and compass interface circuitry. Compass interface circuitry may be configured to provide compass data to other circuitry. Compass interface circuitry or other control circuitry in device 10 may be configured to store compass calibration data, may be configured to turn compass 20 on and off, may be configured to access information on the operational status of other electronic components, may be configured to apply corrections to compass data based on operational status information (also called status data, operational status data, etc.) associated with other electronic components, may be configured to combine these functions or to perform any other compass related functions for device 10.

Device 10 may include other internal electronic components such as component 22. Component 22 may receive electric power along an associated power supply path such as conductive line 24 (sometimes referred to herein as a power supply line, power supply trace, or conductive power line). Conductive line 24 may be configured to supply electric power to component 22 from power supply circuitry (sometimes called a power management unit (PMU)). Component 22 may be a camera, a speaker, an auto-focus lens mechanism, a camera flash, a Light Emitting Diode (LEDs), processing circuitry such as central processing units, memory or other integrated circuits, Global Positioning System (GPS) circuitry, display circuitry, a battery, a vibrator, an actuator or other component. Conductive line 24 may be a single wire, a twisted pair of wires, a conductive trace on a printed circuit board, etc.

Component 22 may be electrically coupled to an associated power return line (sometimes called a power return trace, return line, conductive line, or return trace) such as conductive line 25. Component 22 may be configured to receive power (i.e., electric power) from power supply line 24 and power return line 25. Conductive line 25 may be configured to conduct electric current away from component (e.g., to a ground contact, ground plane etc.). Conductive line 25 may be a single wire, a twisted pair of wires, a conductive trace on a printed circuit board, etc.

Figure 2:
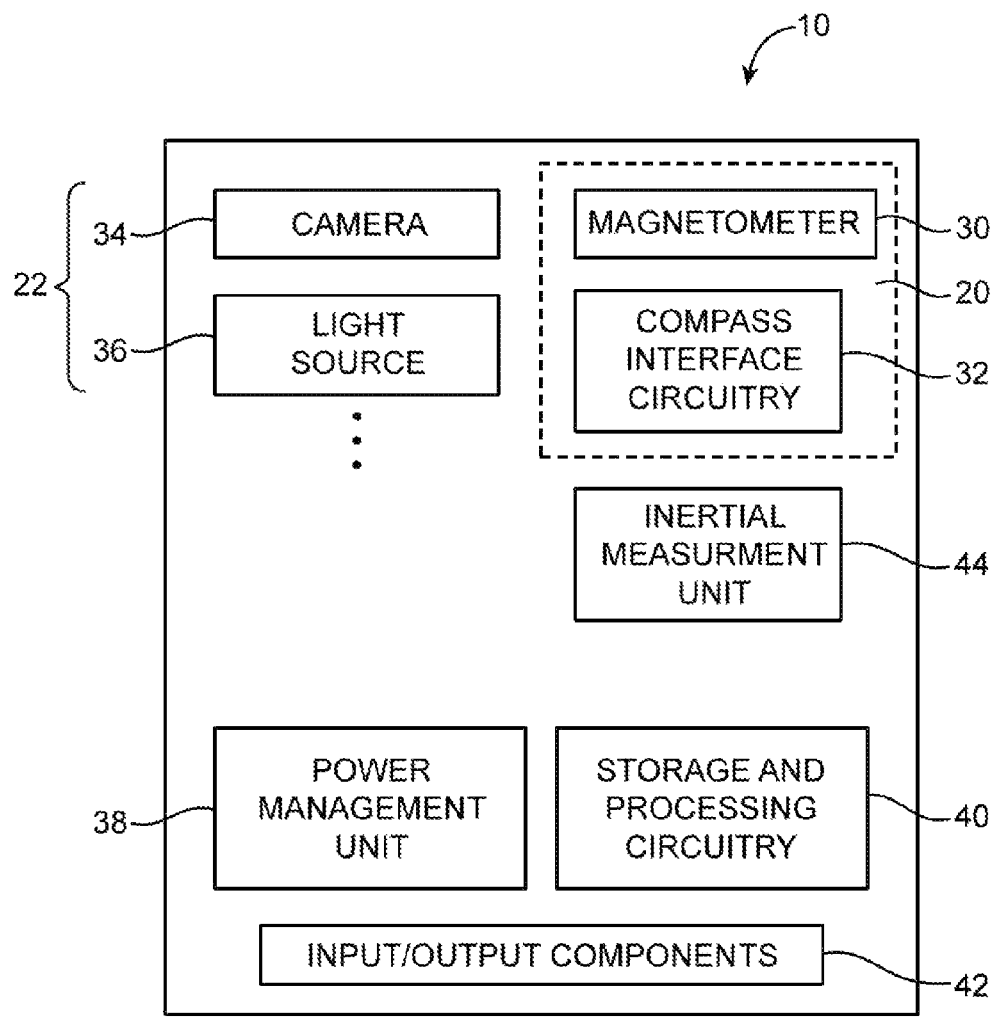
FIG. 2 is a diagram of illustrative circuitry and components for an electronic device having a compass in accordance with an embodiment of the present invention.

As shown in FIG. 2, compass 20 may include a magnetic sensor such as magnetometer 30 and compass interface circuitry such as compass interface circuitry 32. Compass interface circuitry 32 may be configured to collect raw magnetometer data and provide compass data to other control circuitry such as storage and processing circuitry 40 of device 10. Storage and processing circuitry 40 may be configured to deliver compass data from compass 20 to other software applications running on circuitry 40.

Storage and processing circuitry 40 may be configured to further process compass data (e.g., to apply an interference correction offset to the compass data to correct for magnetic interference from components such as components 22 and conductive lines such as conductive line 24 that do not have power return traces for generating compensating magnetic fields). As shown in FIG. 2, components 22 may include one or more cameras (e.g., a front-facing camera, a rear-facing camera, etc.), one or more light sources (e.g., a camera flash, an LED camera light, a flashlight, etc.) or other components.

Device 10 may include control circuitry such as storage and processing circuitry 40. Storage and processing circuitry 40 may include storage such as hard disk drive storage, non-volatile memory (e.g., flash memory or other electrically-programmable-read-only memory configured to form a solid state drive), volatile memory (e.g., static or dynamic random-access-memory), etc.

Processing circuitry in storage and processing circuitry 40 and other control circuits such as control circuits in compass 20 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 40 may be used to run software on device 10, such as internet browsing applications, map applications, voice-over-internet-protocol (VoIP) telephone call applications, email applications, media playback applications, operating system functions, camera functions, camera based applications, light source functions, display functions, GPS operations, etc.

Some applications may use combined data from compass 20 and a positioning sensor such as intertial measurement unit (IMU) 44. Intertial measurement unit 44 may include one or more accelerometers, one or more gyroscopes, GPS circuitry, etc. for determining the location and position of device 10. Storage and processing circuitry 40 may be configured to operate IMU 44 in combination with antenna 20 to provide position and location information to applications running on device 10. Compass 20 may be formed separately from IMU 44 or may be formed as an integral part of IMU 44. In one preferred embodiment that is sometimes discussed herein as an example, compass 20 may be formed as a single integrated circuit attached to a main logic board (e.g., a printed circuit board) using a ball grid array.

Storage and processing circuitry 40 may be used to operate power supply circuitry such as power management unit (PMU) 38 to supply electrical power to components 22 such as camera 34 and light source 36. Storage and processing circuitry 40 may be used to operate input/output components such as input/output components 42 and to process and store data input to device 10 using input/output components 42.

Input/output components 42 may include buttons or speakers such as button 16 and speaker 18 of FIG. 1. Input/output components 42 may include touch-sensitive portions of display 14, may include a keyboard, wireless circuitry such as wireless local area network transceiver circuitry and cellular telephone network transceiver circuitry, and other components for receiving input and supplying output. Components 22 may be internal to device 10 or may have portions that are visible on a portion of an exterior surface of device 10.

Control circuitry such as storage and processing circuitry 40 may include circuitry for interfacing with the resources of compass 20 (e.g., control circuitry of compass interface circuitry 32 may be considered to form part of storage and processing circuitry 40). For example, control circuitry 40 may be configured to run a compass interface software application that interfaces with magnetometer 30.

Figure 3:
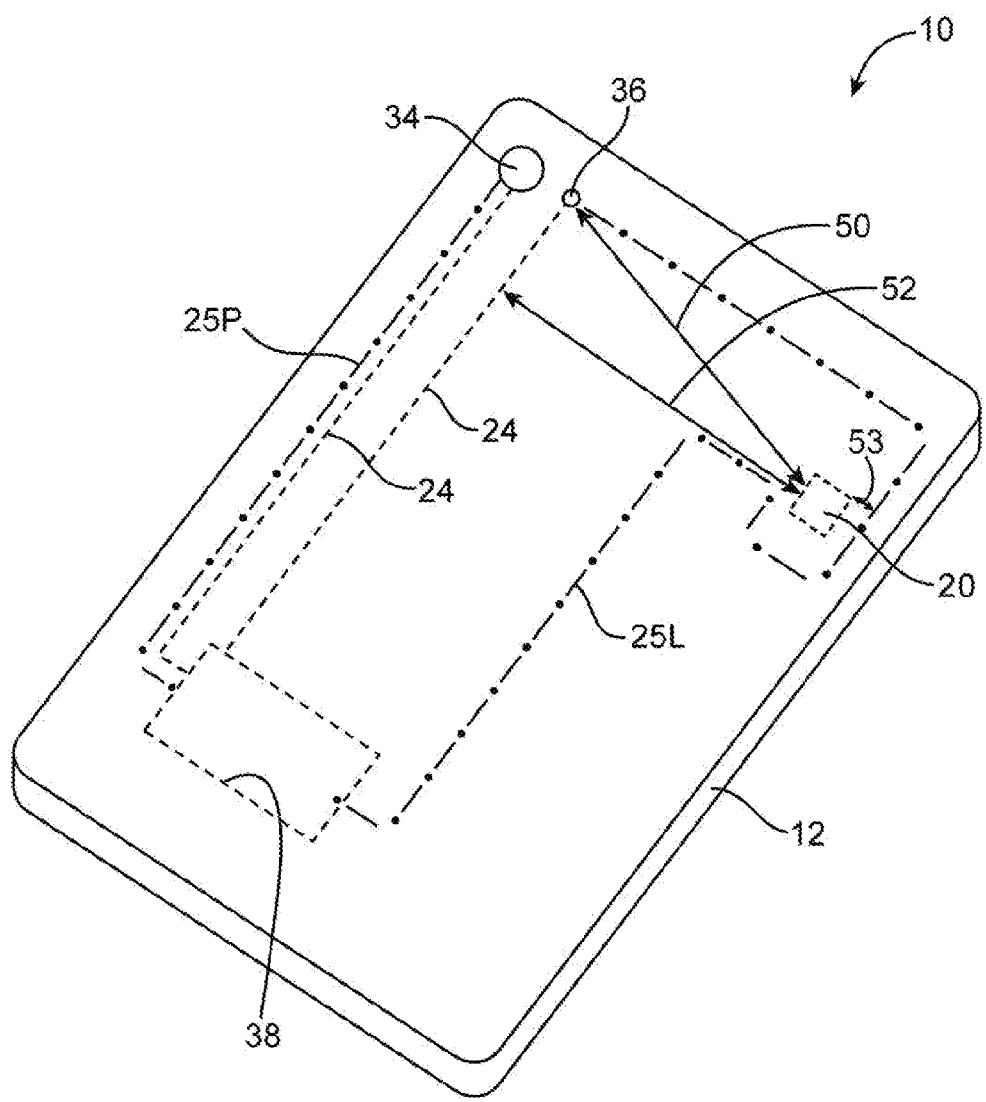
FIG. 3 is a perspective rear view of an illustrative electronic device having a compass, a camera having a conductive lines that generate compensating magnetic fields in accordance with an embodiment of the present invention.

As shown in FIG. 3, camera 34 and light source 36 may be visible on a rear surface of device 10. Camera 34 may be used in combination with light source 36 when capturing images with device 10. Storage and processing circuitry 40 may be configured to continuously display images received by camera 34 on display 14 while displaying integrated location information based on compass data continuously captured by compass 20 on a portion of display 14. Operations of this type in which a component such as camera 34 is operated while compass 20 collects compass data may be improved using compass power return traces such as power return traces 25 that are configured to generate compensating magnetic fields that compensate for interfering magnetic fields generated by components such as camera 34 and power supply lines such as power supply lines 24.

Components such as camera 34 and light source 36 may have associated power supply lines such as conductive lines 24 for delivering power from PMU 38. In the example of FIG. 3, light source 36 has a distance 50 from compass 20 while power supply line 24 associated with light source 36 has a minimum distance 52 from compass 20. Magnetic interference from components such as light source 36 and associated power supply lines depends on distances such as distances 50 and 52 respectively, from compass 20. A smaller distance 50 between compass 20 and light source 36 produces larger magnetic interference with compass 20 when light source 36 is operated. A smaller distance 50 between compass 20 and light source 36 produces larger magnetic interference with compass 20 when light source 36 is operated.

Because magnetic interference depends on distances such as distances 50 and 52, power return traces such as power return traces 25 may be configured to have distances from compass 20 that optimally compensate for magnetic interference from components such as camera 34 and light source 36. As shown in FIG. 3, device 10 may be provided with power return traces such as power return trace 25P that is paired with a power supply line 24 and power return trace 25L that is longer than an associated power supply line 24. Power return trace 25P and power return trace 25L may, if desired form branches of a common power return path.

Power return trace 25L may be routed nearer to compass 20 than an associated power supply line 24. Power return trace 25L may be configured to compensate for an interfering magnetic field that is generated by both power supply line 24 and a component 22 (e.g., camera 34 or light source 36). Power return trace 25L may have portions formed between compass 20 and an associated power supply line 24. Power return trace 25L may have portions that form at least part of a loop around compass 20. Power return trace 25L may have portions formed on a side of compass 20 that is opposite to the side on which an associated power supply line 24 is formed.

Paired power return traces such as power return trace 25P may run parallel to a corresponding power supply line 24 at a distance that is smaller than the distance between the power supply line and compass 20. Power return traces 25 (e.g., traces 25L and 25P) and power supply lines 24 may each be provided with resistors or other discrete components for controlling current in respective power return traces 25 an power supply lines 24.

Figure 4:
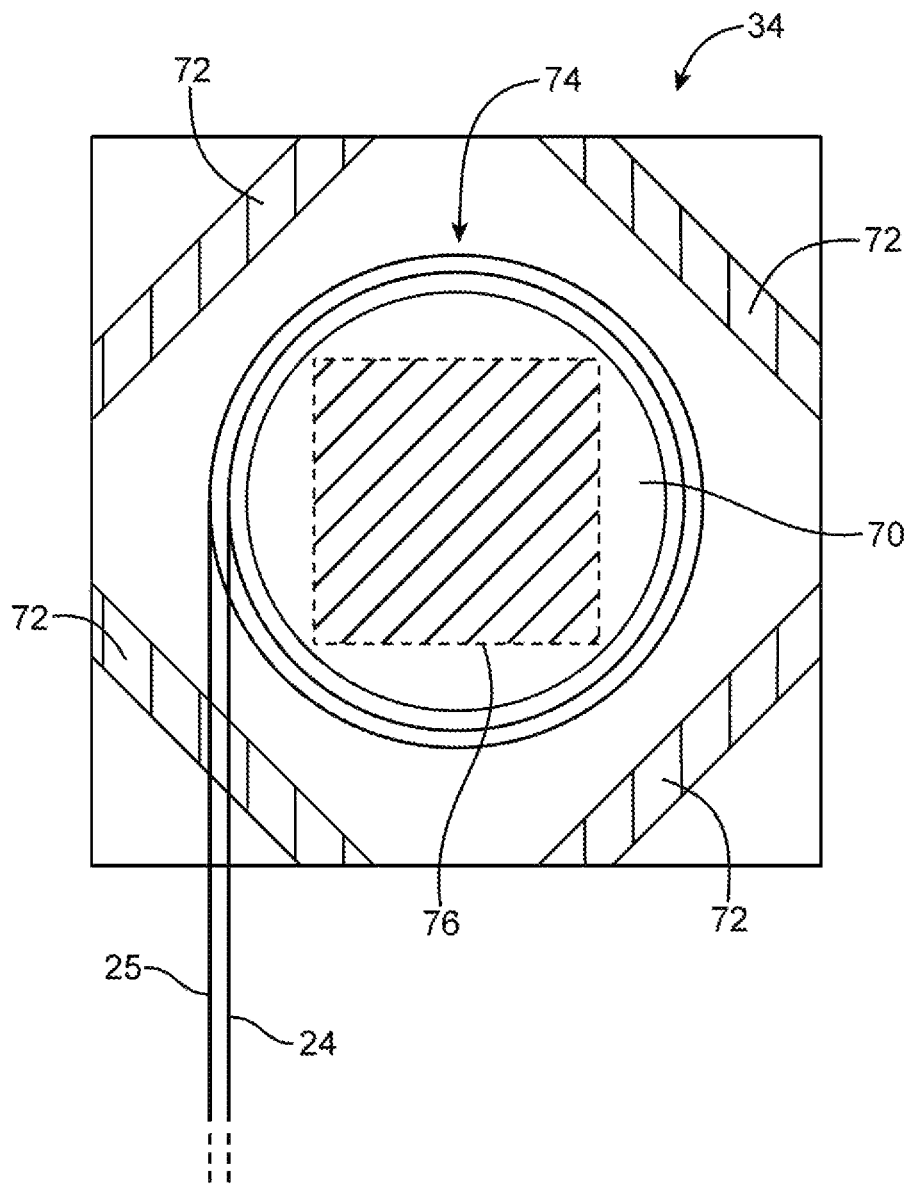
FIG. 4 is a cross-sectional top view of an illustrative camera having an auto-focus mechanism that generates interfering magnetic fields in accordance with an embodiment of the present invention.

Magnetic interference may depend on individual component configuration and operation. Components such as camera 34 may include magnets, wire coils or other elements that generate interfering magnetic fields during component operation. As shown in FIG. 4, camera 34 may include an array of imaging pixels such image pixel array 76 for capturing image light. Camera 34 may include a lens such as lens 70 that focuses image light onto image pixel array 76.

Camera 34 may include an electronic focusing system for moving lens 70 into an optimal focus position. The focusing system of camera 34 may be an auto-focusing system in which storage and processing circuitry 40 (see FIG. 2) uses image data captured by camera 34 to determine a best focus position for lens 70. The focusing system of camera 34 may include one or more magnets such as fixed magnets 72 and a coil of conductive wire such as coil 74.

Coil 74 may include any number of turns (e.g., one turn, two turns, more than two turns, more than 5 turns, more than 10 turns, 10 to 500 turns, more than 20 turns, more than 40 turns, 50-60 turns, more than 50 turns, less than 60 turns, less than 100 turns or less than 500 turns) of wire wrapped around lens 70. Wire coil 74 may be coupled to a power supply line such as power supply line 24.

Electric current may be supplied along power supply line 24 from a power management unit (e.g., PMU 38 of FIG. 1). Electric current may flow from power supply line 24, through turns of wire associated with coil 74 to a ground line such as power return trace 25. Power return trace 25 may electrically couple coil 74 to a ground plane or other ground conductor in a layer of a printed circuit board or otherwise positioned in device 10. Power return trace 25 may run alongside power supply line 24 or may divert from power supply line 24 to route return current near compass 20. During normal operation of camera 34, lens 70 may be moved to improve the focus of image light on image sensor array 76. Changing magnetic fields generated by changing current flowing through coil 74 may interact with fixed magnets 72 and cause lens 70 to move.

Figure 5:
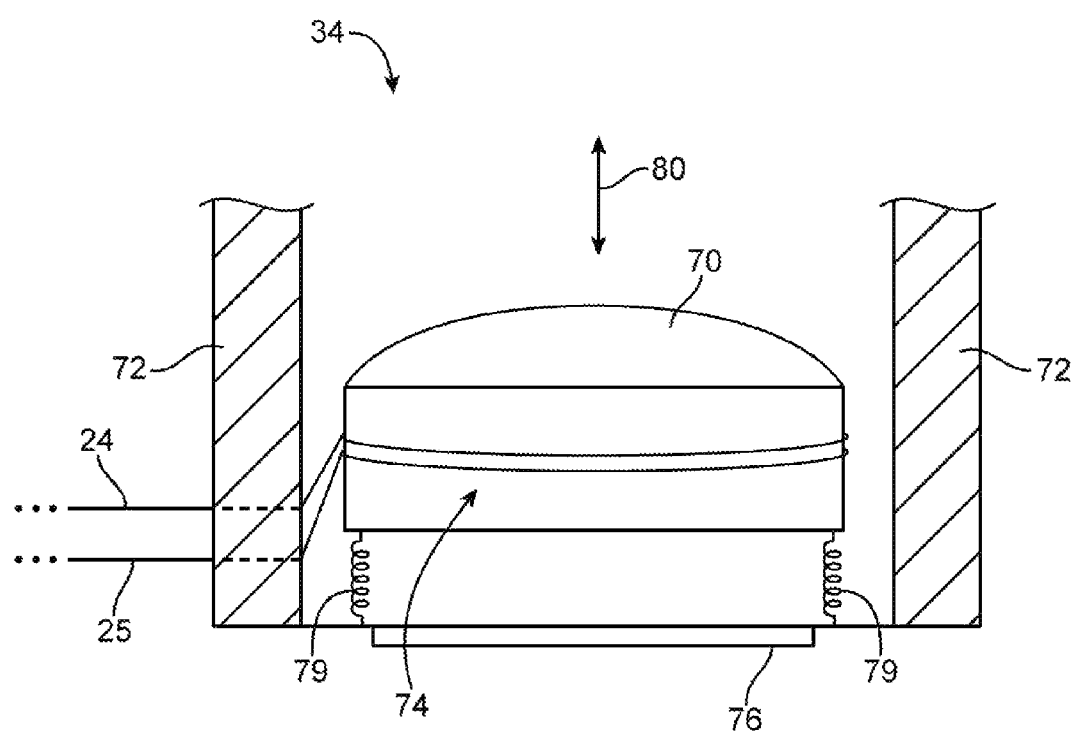
FIG. 5 is a cross-sectional side view of an illustrative camera having an auto-focus mechanism that generates interfering magnetic fields in accordance with an embodiment of the present invention.

Lens 70 may be coupled to one or more elastomeric attachment members such as springs 79, as shown in FIG. 5. Springs 79 may be configured to provide a natural position (sometimes referred to as a default position) for lens 70 with respect to image pixel array 76 within camera 34. Springs 79 may be configured so that the default position of lens 70 with respect to image pixel array 76 is an infinity focus position (i.e., a position in which the lens is a distance from the image pixel array that is equal to the focal length of camera 34).

Forces on lens 70 generated by interactions between the magnetic field generated by the current flow in coil 74 and fixed magnets 72 may cause lens 70 to move closer to, or further from, image pixel array 76 as indicated by arrows 80. Moving lens 70 closer to, or further from, image pixel array 76 by changing the current flowing through coil 74 may change the distance from camera 34 at which objects appear in focus at image pixel array 76. Springs 79 may be configured to provide resistance to motion of lens 70.

A constant current through coil 74 may therefore be needed to hold lens 70 in a position that is different from the default position determined by springs 79. Changing the current through coil 74 move lens 70 to a new position relative to image pixel array 76. A relatively larger current through coil 74 may move lens 70 a relatively larger distance from image pixel array 76 than its default position. A relatively larger current may also produce a relatively larger magnetic field that may interfere with the operation of compass 20. Providing device 10 with one or more power return lines such as traces 25 may provide a return current that automatically rises and falls with the current delivered to, for example, camera 34 in order to compensate for the interfering magnetic field generated by camera 34.

Figure 6:
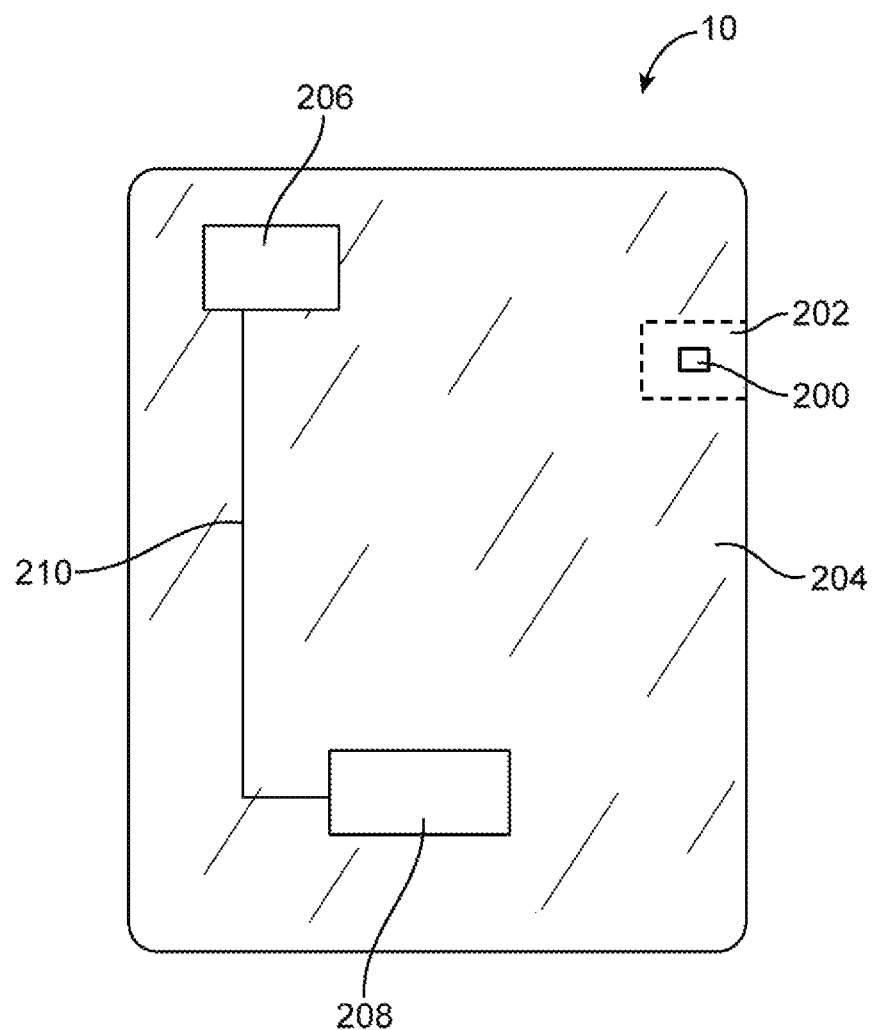
FIG. 6 is a diagram of an illustrative electronic device having a compass with a power line and a notched ground plane in accordance with an embodiment of the present invention.

If desired, as shown in FIG. 6, device 10 may include a ground plane such as ground plane 204. Electrical power may supplied to a component such as component 206 from power supply circuitry such as power supply 208 using a power line such as power line 210. In some configurations, current flowing in a ground plane such as ground plane 204 can generate additional interfering magnetic fields. A recess such as notch 202 may be provided in ground plane 204 under compass 200. A cutout in a ground plane such as notch 202 may reduce the amount of return current flowing through ground plane 204 in the vicinity of compass 20.

Figure 7:
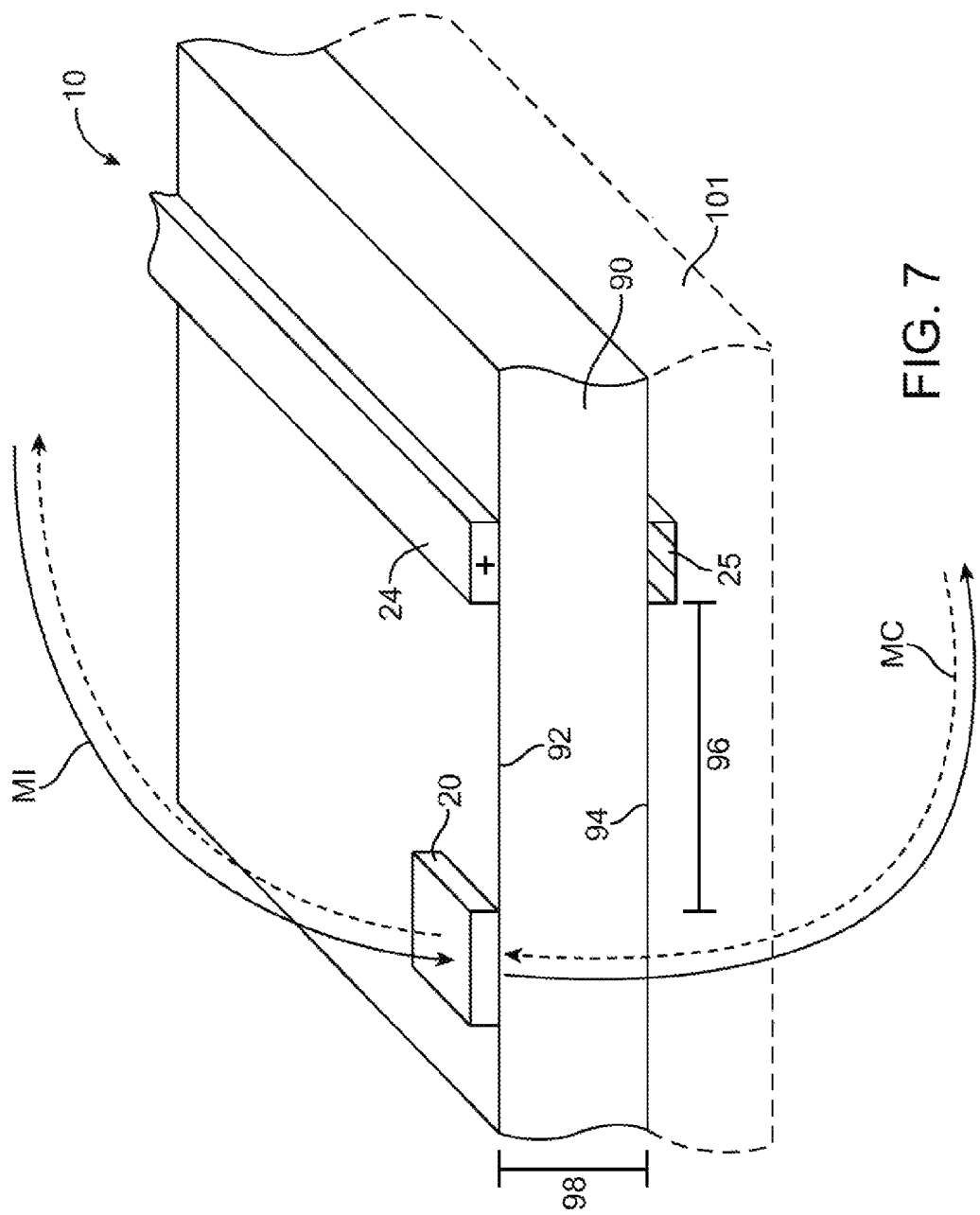
FIG. 7 is a perspective view of a portion of an illustrative printed circuit having a compass and a power supply line with a corresponding power return trace in accordance with an embodiment of the present invention.

As shown in FIG. 7, compass 20 of device 10 may be mounted to a top surface such as surface 92 of a printed circuit board (PCB) such as printed circuit board 90. Printed circuit board 90 may include one or more layers formed from dielectrics such as fiberglass-filled epoxy (e.g., as a rigid layer in a PCB stack) and polyimide (e.g., as a flexible layer in a PCB stack), FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (woven glass and epoxy), CEM-4 (woven glass and epoxy), CEM-5 (woven glass and polyester), paper impregnated with phenolic resin, polystyrene, polyimide, polytetrafluoroethylene (PTFE), plastic, other polymers, ceramics, or other suitable dielectrics.

Printed circuit board 90 may include one or more layers of prepreg (i.e., pre-impregnated layers of fiber and resin) and one or more layers of copper or other conductive materials Power supply trace 24 may be a patterned conductive trace (e.g., a metal trace) on surface 92 of PCB 90. Power supply trace 24 may form a portion of a positive power supply line to a component such as camera 24 or light source 36 of FIG. 2. A power return line such as power return trace 25 may be formed on an opposing bottom surface such as surface 94 of PCB 90. Power return trace 25 may be a patterned conductive trace (e.g., a metal trace) that runs along bottom surface 94 of PCB 90 under power supply trace 24. In this way, current flowing through power supply trace 24 that generates an interfering magnetic field such as interfering magnetic field MI for compass 20 may be compensated by an equal (magnitude) and opposite (direction) compensating magnetic field such as magnetic field MC generated by current flowing in an opposite direction in power return trace 25.

In order to isolate compass 20 from interfering magnetic fields and to reduce the effect of the distance between power supply trace 24 and power return trace 25 on the interfering and compensating magnetic fields MI and MC, power supply trace 24 and power return trace 25 may be formed at a lateral distance 96 from compass 20. Lateral distance 96 may be significantly larger than distance 98 between power supply trace 24 and power return trace 25. As an example, distance 98 may be equal to the thickness of PCB (e.g., 10 microns to 0.5 mm or other suitable PCB thicknesses) while distance 96 may be as much as a several millimeters or more (e.g., more than 1 cm, more than 2 cm, more than 3 cm, 1 cm to 3 cm, 5 mm to 2 cm, 2 cm to 4 cm, etc.).

If desired, PCB 90 may include additional PCB layers such as substrate layer 101 under power return trace 25 attached to surface 94 (e.g., power return trace 25 may be formed between two layers of PCB 90). PCB 90 may include interior patterned conductive traces that form signal lines that convey signals within PCB 90 and/or from PCB 90 to other components such as components 22 (see FIG. 2).

Figure 8:
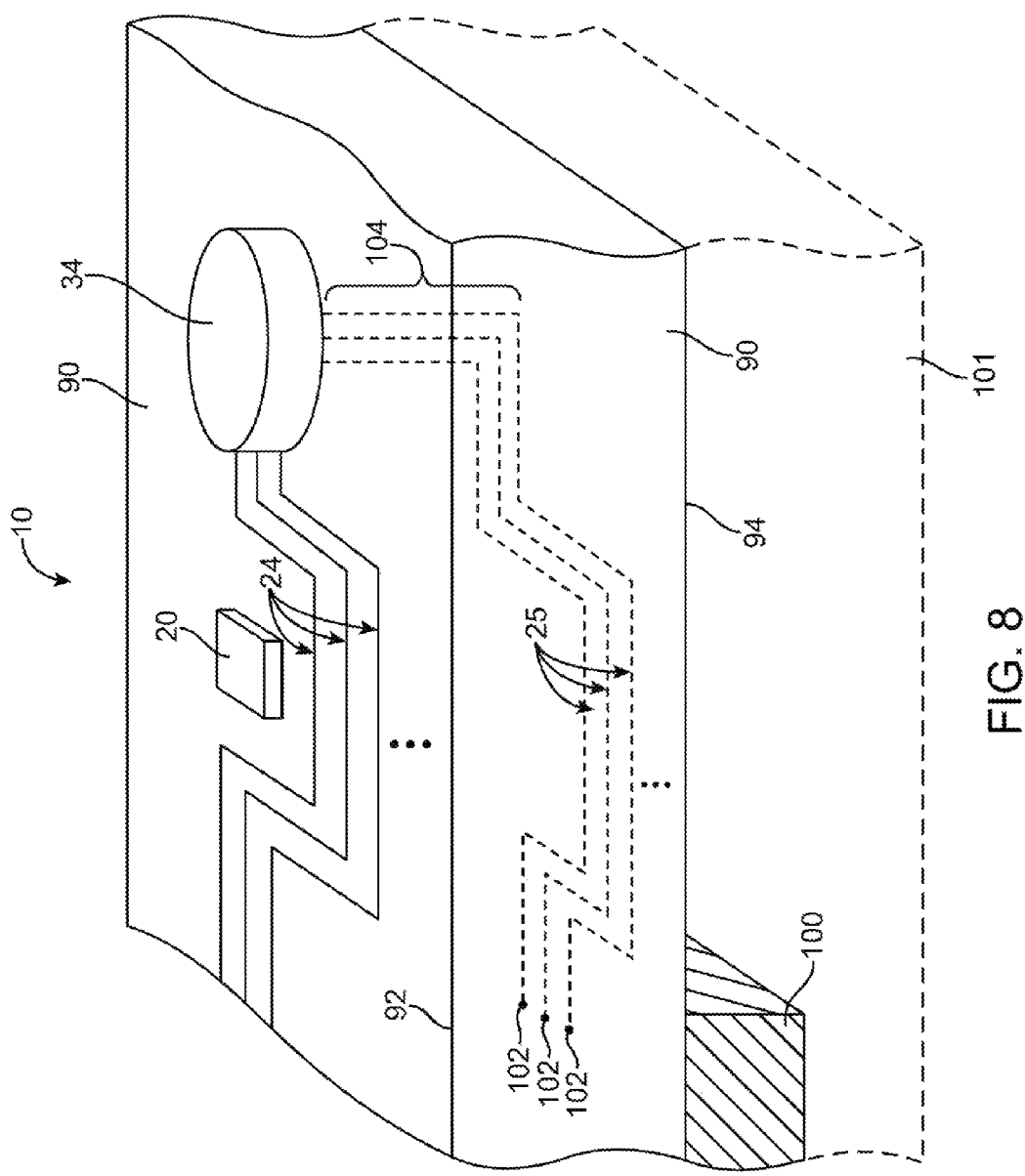
FIG. 8 is a perspective view of a portion of an illustrative printed circuit having a compass and multiple power supply lines with multiple corresponding power return traces in accordance with an embodiment of the present invention.

The example of FIG. 7 in which a single power supply trace 24 has a single corresponding power return trace 25 on surface 94 of PCB 90 is merely illustrative. If desired, multiple power supply traces 24 may be matched by multiple power return traces 25 as shown in FIG. 8. As shown in FIG. 8, multiple power supply traces 24 for a component such as camera 34 on surface 92 of PCB 90 may be routed around a magnetic sensitive component such as compass 20 on surface 92 (e.g., traces 24 may follow a path on surface 92 that is at predetermined minimum distance from compass 20). PCB 90 may be provided with power return traces 25 on bottom surface 94 of PCB 90 that carry return current from, for example, camera 34. Conductive paths from top surface 92 through to bottom surface 94 of PCB 90 may be formed from vias such as vias 104. Vias 104 may couple camera 34 to power return traces 25.

Power return traces 25 may follow a path on surface 94 of PCB 90 that mimics that path of power supply traces 24 on surface 92 so that power return traces 25 are formed under power supply traces 24 in order to generate compensating magnetic fields to compensate for interfering magnetic fields generated by power supply lines 24 (and camera 34). Power return traces 25 may be formed under power supply lines 24 in the vicinity of compass 20. Power return traces 25 may include ground contacts such as ground contacts 102 that couple power return traces 25 to a ground plane such as ground plane 100 under PCB 90. Ground plane 100 may be formed in a region of PCB 90 that is at a predetermined minimum distance from compass 20 (e.g., more than 3 cm, more than 5 cm, 3 to 5 cm, less than 5 cm, more than 2 cm, etc.).

If desired, PCB 90 may include additional PCB layers such as substrate layer 101 under ground plane 100 attached to surface 94 (e.g., ground plane 100 may be formed between two layers of PCB 90).

Figure 9:
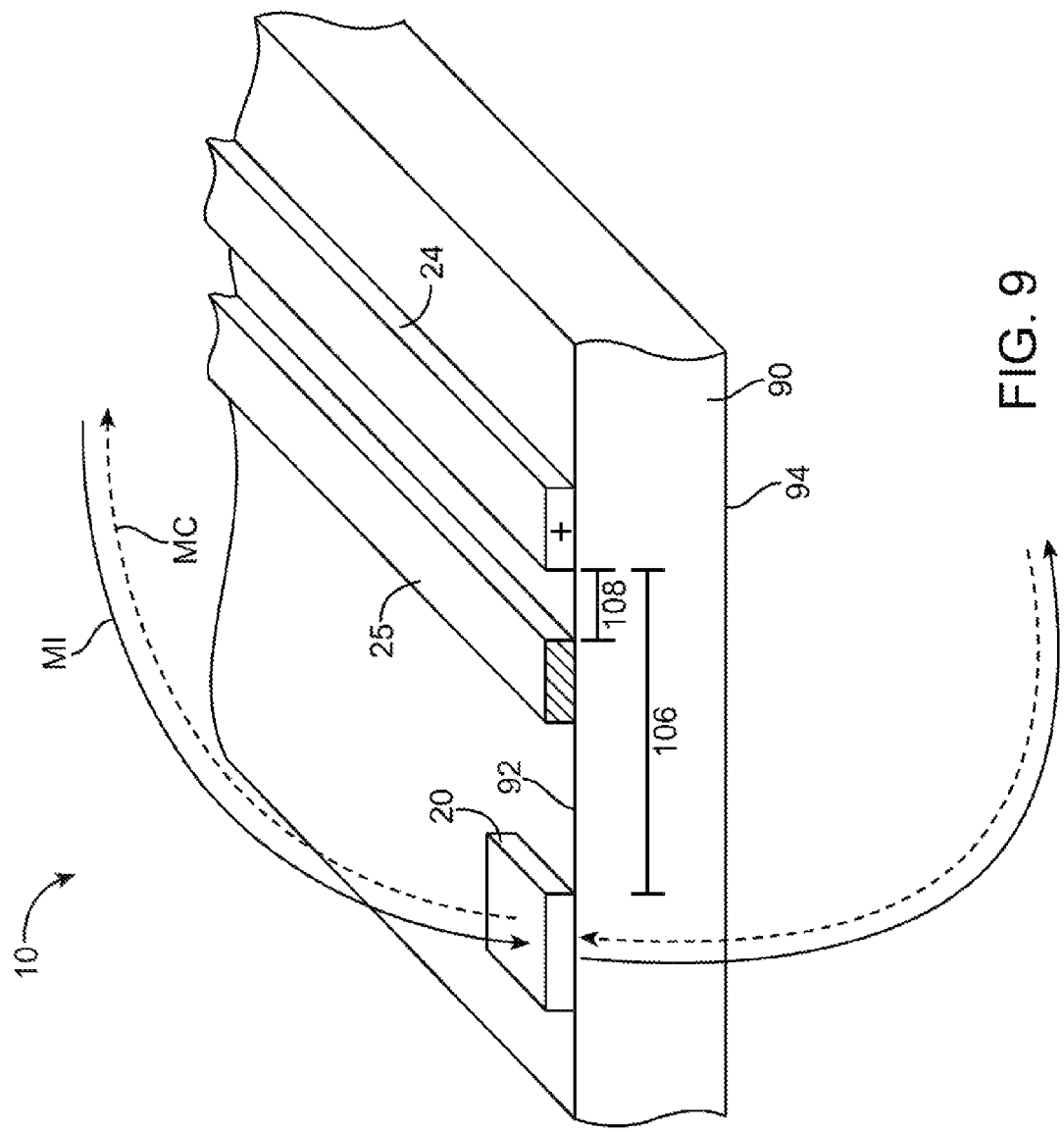
FIG. 9 is a perspective view of a portion of an illustrative printed circuit having a compass and a power supply line with a corresponding power return trace in accordance with an embodiment of the present invention.

Providing PCB 90 with a power supply trace on a top surface and a corresponding power return trace on a bottom surface is merely illustrative. If desired, power return trace 25 may be formed on top surface 92 of PCB 90 as shown in FIG. 9. As shown in FIG. 9, compass 20 and a power supply line such as power supply line 24 of device 10 may be mounted to a top surface such as surface 92 of a PCB 90. A power return line such as power return trace 25 may run parallel to power supply line 24 on top surface 92 of PCB 90. Power return trace 25 may be implemented using a patterned conductive trace on top surface 92 of PCB 90 that runs alongside (and parallel to) power supply trace 24. In this way, current flowing through power supply trace 24 that generates an interfering magnetic field such as interfering magnetic field MI for compass 20 may be compensated by an equal (magnitude) and opposite (direction) compensating magnetic field such as magnetic field MC generated by current flowing in an opposite direction in power return trace 25.

In order to isolate compass 20 from interfering magnetic fields and to reduce the effect of the distance between power supply trace 24 and power return trace 25 on the interfering and compensating magnetic fields MI and MC, power supply trace 24 may be configured to have a minimum distance 106 from compass 20. Lateral distance 106 may be significantly larger than a maximum distance 108 between power supply trace 24 and power return trace 25. As an example, distance 108 may be as small as a few microns (e.g., 10 microns-20 microns, 10 microns to 50 microns, 10 microns to 100 microns, 50 microns to 0.2 mm, 50 microns to 0.5 mm, or other suitable distance) while distance 106 may be as much as a several millimeters or more (e.g., more than 1 cm, more than 2 cm, more than 3 cm, 1 cm to 3 cm, 5 mm to 2 cm, 2 cm to 4 cm, etc.).

Figure 10:
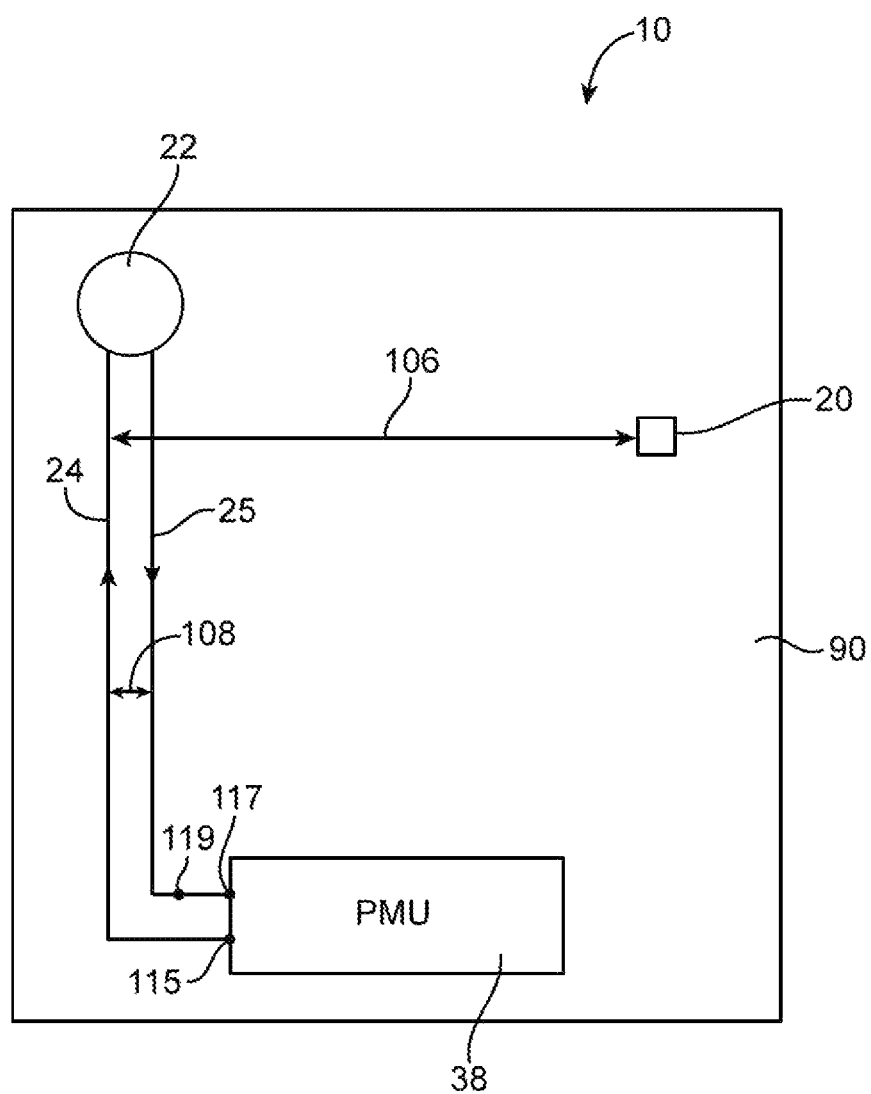
FIG. 10 is a diagram of an illustrative electronic device having a compass, an electronic component, a power supply line for the electronic component and a corresponding power return trace near the power supply line in accordance with an embodiment of the present invention.

In general, as shown in FIG. 10, a power supply line such as power supply line 24 that supplies electric current from circuitry such as power supply unit 38 to a component such as component 22 may have an associated power return trace such as power return trace 25 that runs along the length of power supply line 24. Power return trace 25 may run alongside power supply trace 24 at a distance such that a maximum distance between power supply trace 24 and power return trace 25 such as distance 108 is smaller than a minimum distance such as distance 106 between power supply trace 24 and a magnetic-sensitive component such as compass 20.

Power supply traces 24 may be coupled to a positive power supply terminal such as terminal 115 of a power source as power management unit 38. Power return trace 25 may electrically couple component 22 to a ground power supply terminal such as terminal 117 or may couple component 22 to a ground conductor through a ground contact such as contact 119.

Figure 11:
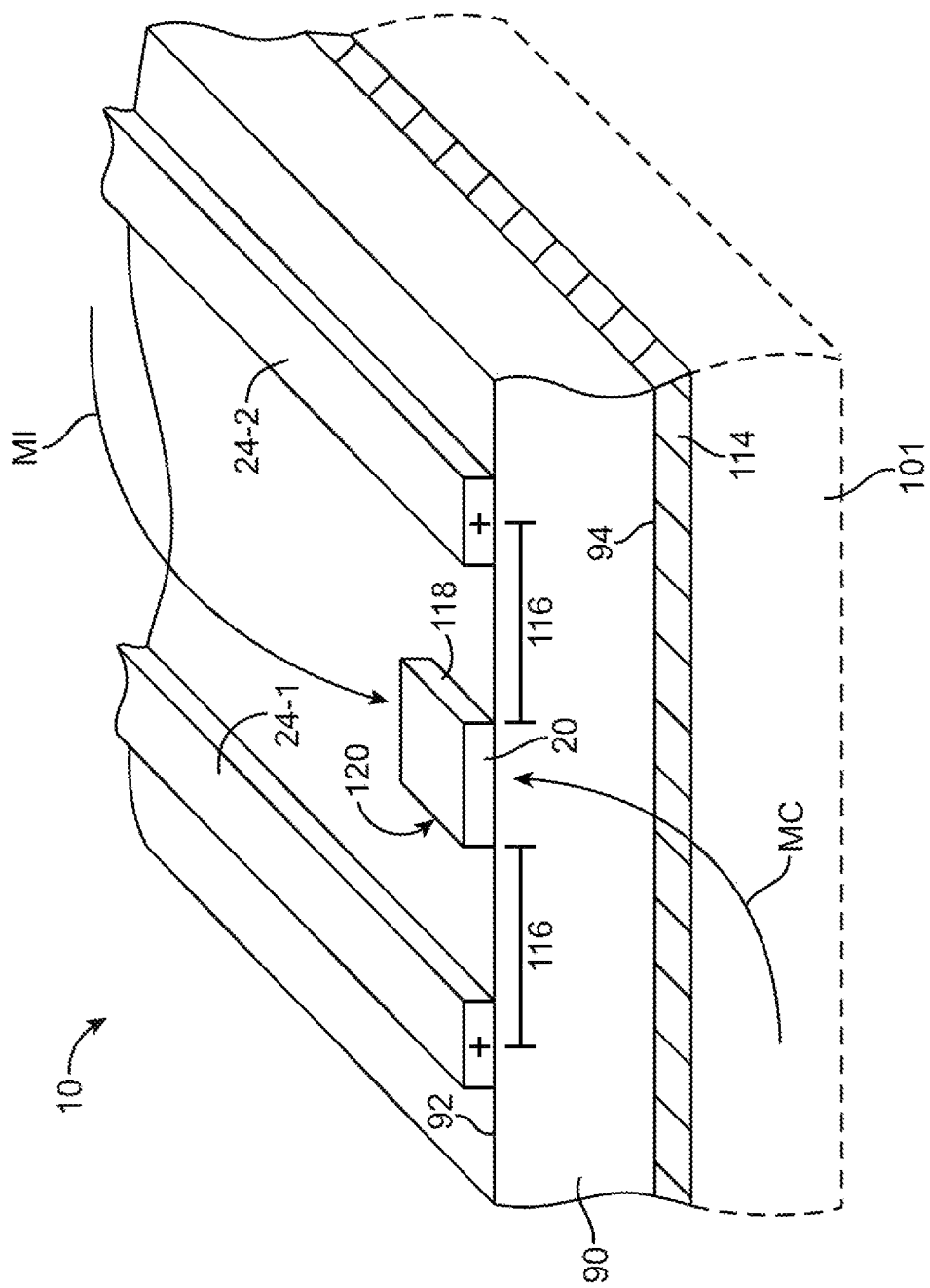
FIG. 11 is a perspective view of a portion of an illustrative printed circuit having a compass and a multiple power supply lines on opposing sides of the compass in accordance with an embodiment of the present invention.

As shown in FIG. 11, a compensating magnetic field that compensates for an interfering magnetic field generated by a power supply line such as power supply line 24-2 may be generated by an additional power supply line such as power supply line 24-1 on an opposing side of compass 20. Dual power supply lines 24-1 and 24-2 may be formed on surface 92 of PCB 90 on opposing sides of a magnetic sensor such as compass 20.

PCB 90 may be configured to include a power supply line 24 that is formed on surface 92 of PCB 90 having a minimum lateral distance 116 compass 20 (e.g., power supply line 24-2 at a distance 116 from edge 118) and an associated second power supply line 24 formed at a same (common) minimum lateral distance 116 from compass 20 (e.g., power supply line 24-1 at a distance 116 from edge 120). A current flowing in power supply line 24-2 may generate an interfering magnetic field for compass 20. An equal or substantially equal current flowing in power supply line 24-1 may generate an (equal-magnitude, opposite-direction) compensating magnetic field for compass 20.

Power supply traces 24 may be implemented using patterned conductive traces on surface 92 of PCB 90. Power supply traces 24 may form portions of a positive power supply line to one or more components 22 such as camera 34 or light source 36 of FIG. 2. Power supply traces 24-1 and 24-2 of FIG. 11 may be power supply traces for a single component 22 (e.g., branches of common power supply path 24) or may be power supply traces for more than one component 22.

If desired, return current from a component 22 that is supplied by power supply lines 24-1 and 24-2 may flow through a ground plane such as ground plane 114 on bottom surface 94 of PCB 90. If desired, PCB 90 may include additional PCB layers such as substrate layer 101 under ground plane 114.

Providing PCB 90 with return current from a component 22 that is supplied by power supply lines 24-1 and 24-2 ground plane 114 is merely illustrative. If desired, power supply traces 24-1 and 24-2 that are formed on opposing sides of compass 20 on surface 90 may each have associated power return traces 25-1 and 25-2 for providing enhanced magnetic field compensation for compass 20 as shown in FIG. 12.

Figure 12:
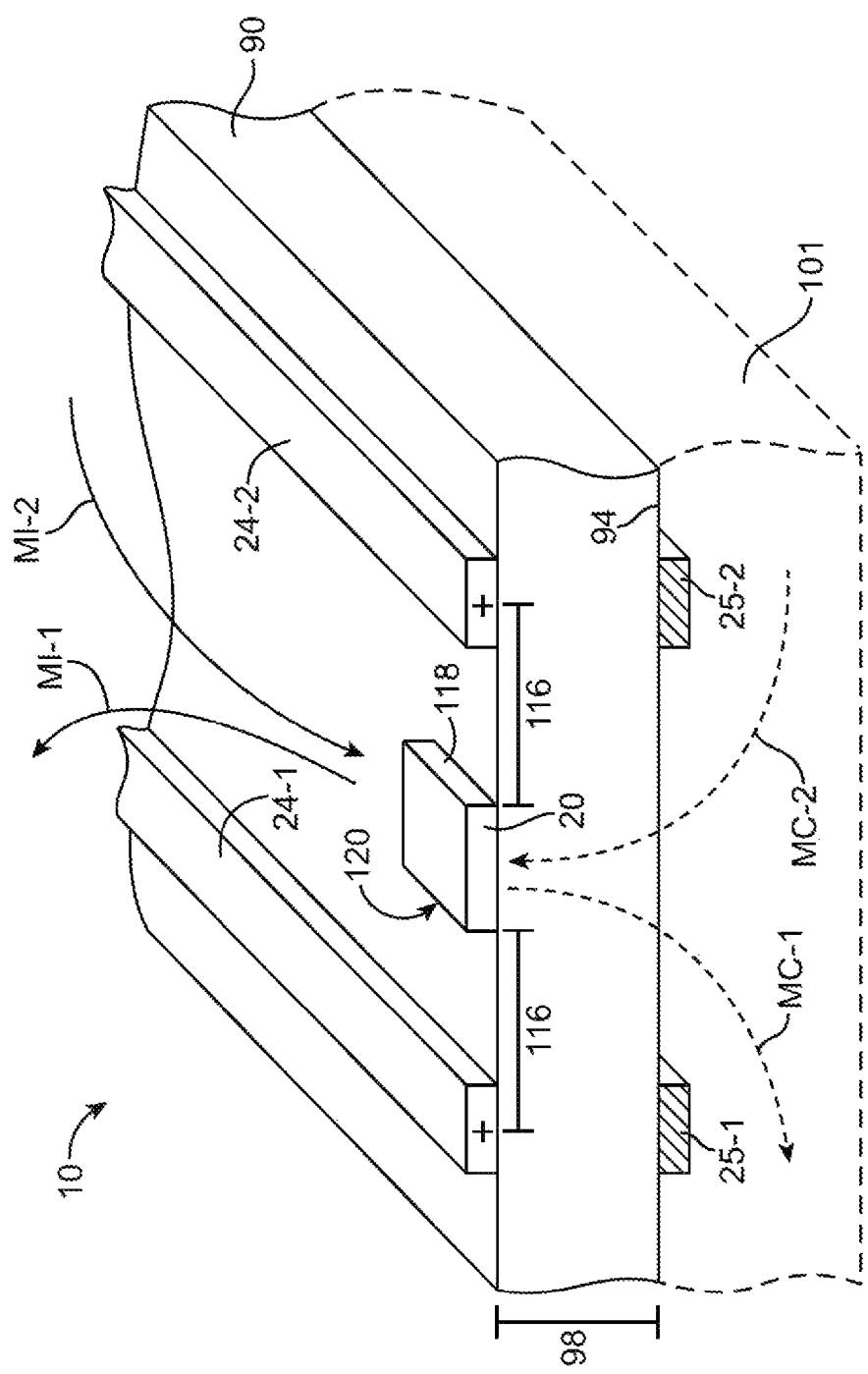
FIG. 12 is a perspective view of a portion of an illustrative printed circuit having a compass and a multiple power supply lines with corresponding power return traces on opposing sides of the compass in accordance with an embodiment of the present invention.

As shown in FIG. 12, power return traces such as traces 25-1 and 25-2 may be formed on an opposing bottom side (e.g., side 94) of PCB 90 under associated power supply lines 24-1 and 24-2. Compass 20 of device 10 may be mounted to a top surface such as surface 92 of a PCB 90. Power supply traces 24 may be implemented using patterned conductive trace on surface 92 of PCB 90. Power supply lines 24-1 and 24-2 may be formed at a common lateral distance 116 from compass 20. Each of power supply lines 24-1 and 24-2 may have an associated power return line such as power return traces 25-1 and 25-2 formed on an opposing bottom surface such as surface 94 of PCB 90. Power return traces 25-1 and 25-2 may be implemented using patterned conductive traces that run along bottom surface 94 of PCB 90 under corresponding power supply traces 24-1 and 24-2 and parallel to corresponding power supply traces 24-1 and 24-2 respectively.

In this way, current flowing through each power supply trace 24 that generates an interfering magnetic field such as interfering magnetic fields MI-1 and MI-2 for compass 20 may be compensated by a substantially equal (magnitude) and opposite (direction) compensating magnetic field such as magnetic fields MC-1 and MC-2 generated by current flowing in an opposite direction in power return traces 25. In this way, current flowing through a ground plane such as ground plane 114 of FIG. 11 may be avoided in the vicinity of compass 20.

In order to isolate compass 20 from interfering magnetic fields and to reduce the effect of the distance between power supply traces 24-1 and 24-2 and associated power return traces 25-1 and 25-2, respectively, on interfering and compensating magnetic fields MI-1, MI-2, MC-1 and MC-2, power supply traces 24 and power return traces 25 may be formed at a lateral distance 116 from compass 20. Lateral distance 116 may be significantly larger than distance 98 between power supply traces 24-1 and 24-2 and corresponding power return traces 25-1 and 25-2 respectively. As an example, distance 98 may be equal to the thickness of PCB 90 (e.g., 10 microns to 0.5 mm or other suitable PCB thicknesses) while distance 116 may be as much as a several millimeters or more (e.g., more than 1 cm, more than 2 cm, more than 3 cm, 1 cm to 3 cm, 5 mm to 2 cm, 2 cm to 4 cm, etc.).

Figure 13:
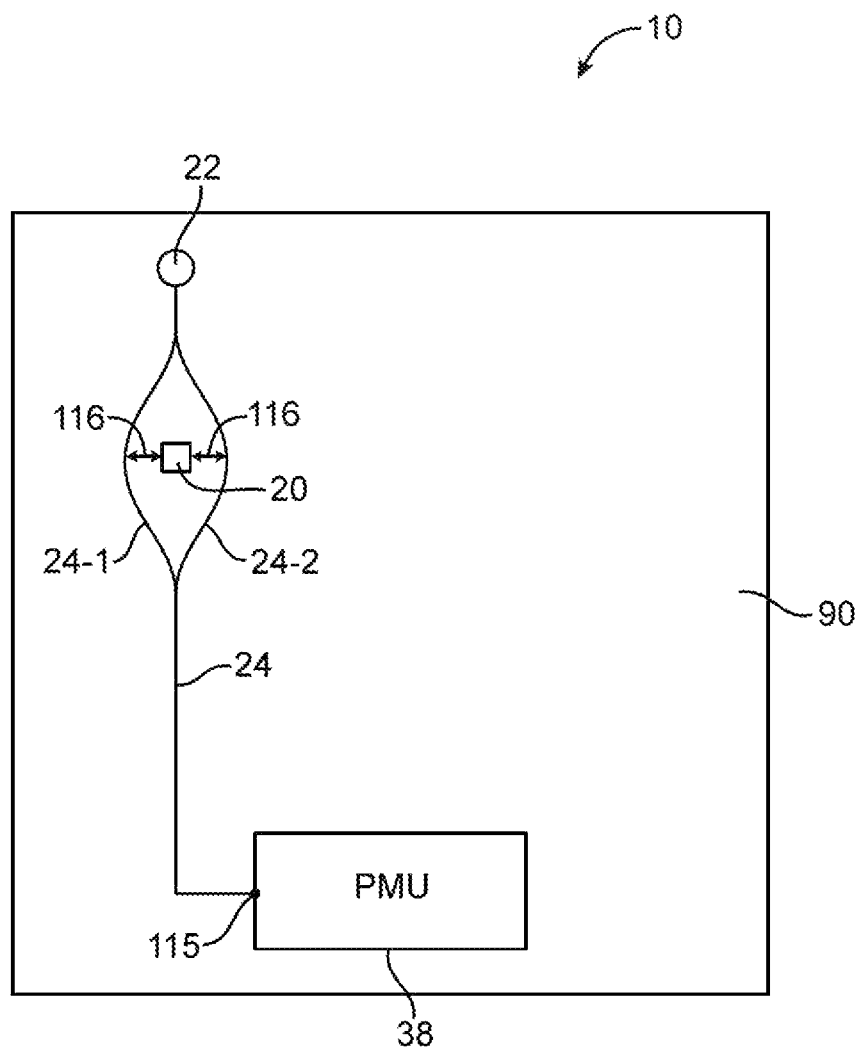
FIG. 13 is a diagram of an illustrative electronic device having a compass, an electronic component, and multiple branches of a common power supply path for the electronic component in accordance with an embodiment of the present invention.

In general, as shown in FIG. 13, power may be supplied from power supply circuitry such as power management unit 38 to component 22 along a conductive power supply path such as power supply path 24 that has multiple branches such as branches 24-1 and 24-2 that run along on opposing sides of a magnetic sensor such as compass 20.

Electric current flowing through power supply line 24 may be split so that substantially half of the current runs through branch 24-1 and substantially half of the current runs through branch 24-2. Power return traces such as return traces 25 may run under power supply path 24 including portions under branch 24-1 and portions under branch 24-2 as shown in FIG. 12. Power supply trace 24 may be coupled to a positive power supply terminal such as terminal 115 of a power source as power management unit 38.

As described above in connection with FIGS. 4 and 5, some components 22 may generate interfering magnetic fields in addition to interfering magnetic fields generated by power supply lines that supply electric current to the component. For example, component 22 may include a camera such as camera 34 having a wire coil with multiple turns of wire for a lens focusing mechanism. Electric current flowing through multiple turns of a wire coil may generate magnetic fields. For this reason, power return traces such as power return traces 25 may be configured to run closer to magnetic sensors such as compass 20 than power supply lines 25 to compensate for interfering magnetic fields from both power supply lines 24 and components 22 as shown in FIGS. 14, 15, 16, and 17.

Figure 14:
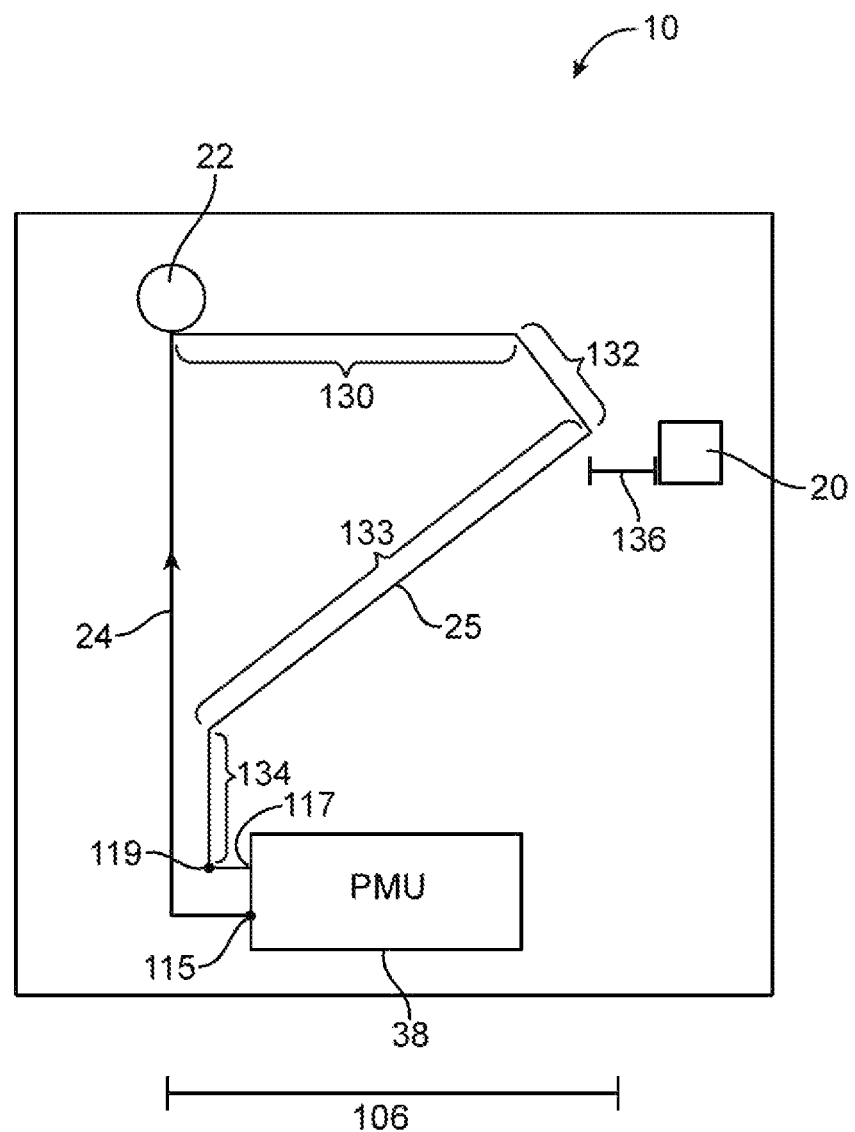
FIG. 14 is a diagram of an illustrative electronic device having a compass, an electronic component with a power supply line, and a power return trace formed with a portion deviates away from the power supply line toward the compass in accordance with an embodiment of the present invention.

As shown in FIG. 14, a power supply line such as power supply line 24 that supplies electric current from circuitry such as power supply unit 38 to a component such as component 22 may have an associated power return trace such as power return trace 25 that runs away from component 22 toward compass 20. Power return trace 25 may include multiple portions. Power return trace 25 may include a portion such as portion 134 that runs parallel to power supply line 24, a portion such as portion 130 that runs perpendicular to power supply line 24 and portions such as portions 132 and 133 that run at angles (e.g., acute angles or obtuse angles) with respect to power supply line 24. Power supply trace 24 and power return trace 25 may be implemented using patterned conductive traces on a surface of PCB 90.

Power return trace 25 may be configured to follow a non-linear path on a surface of PCB 90. As shown in FIG. 14, power return trace 25 may deviate from a power supply path defined by a power supply line such as power supply line 24 that extends along the path between power supply circuitry 38 and electronic component 22. The deviation of power return trace 25 may extend toward compass 20.

Some portions (e.g., portion 132) of power return trace 25 may be shorter than other portions (e.g., portion 133) of return trace 25. Return trace 25 may be configured to pass at a minimum distance such as minimum distance 136 from compass 20. Minimum distance 136 may be significantly smaller than a minimum distance such as minimum distance 106 between power supply trace 24 and compass 20.

For example, minimum distance 136 may be less than 1 cm, less than 2 cm, less than 3 cm, less than 50 mm, or other distance while minimum distance 106 may be more than 1 cm, more than 2 cm, more than 3 cm, more than 4 cm, 1 cm-4 cm, etc. Because magnetic field strength depends on distance from the magnetic field generating source, providing PCB 90 with a power return trace 25 having a minimum distance 136 that is smaller than the distance (e.g., distance 106) from power supply line 24 may help generate compensating magnetic fields that compensate for interfering magnetic fields from both power supply lines such as power supply lines 24 and electronic components such as components 22. This is because interfering magnetic fields at compass 20 generated by both power supply line 24 and electronic component 22 may be larger than interfering magnetic fields from only one of power supply line 24 and component 22.

The closer proximity of power return trace 25 to compass 20 results in an increased magnetic field strength at compass 20 from power return trace 25 than from power supply trace 24 even if the current flowing in both is the same. Providing PCB 90 with a power return trace such as power return trace 25 that deviates away from a path defined by power supply path 24 toward compass 20 as shown in FIG. 14 may help generate compensating magnetic fields that compensate for interfering magnetic fields from both power supply lines such as power supply lines 24 and electronic components such as components 22.

Power supply traces 24 may be coupled to a positive power supply terminal such as terminal 115 of a power source as power management unit 38. Portion 134 of power return trace 25 may electrically couple component 22 to a ground power supply terminal such as terminal 117 or may couple component 22 to a ground conductor through a ground contact such as contact 119.

Figure 15:
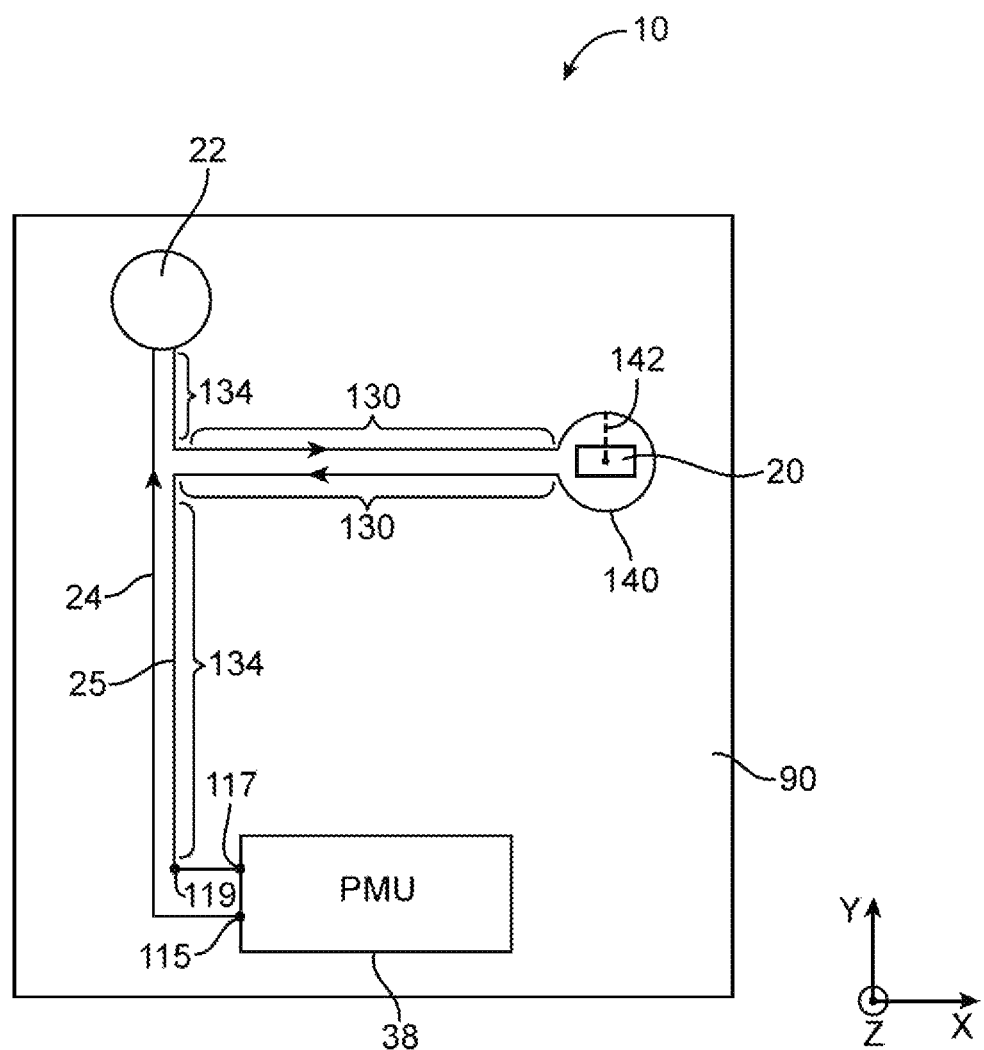
FIG. 15 is a diagram of an illustrative electronic device having a compass, an electronic component with a power supply line, and a power return trace that carries electric current around the compass in accordance with an embodiment of the present invention.

If desired, power return trace 25 may include a portion that runs around a magnetic sensor such as compass 20 as shown in FIG. 15. As shown in FIG. 15, a power supply line such as power supply line 24 that supplies electric current from circuitry such as power supply unit 38 to a component such as component 22 may have an associated power return trace such as power return trace 25 that runs at least partially around compass 20. Power supply trace 24 and power return trace 25 may be implemented using patterned conductive traces on one or more surfaces of PCB 90.

Power return trace 25 may include multiple portions. Power return trace 25 may include portions such as portions 134 that run parallel to power supply line 24, portions such as portions 130 that run perpendicular to power supply line 24 and portions such as portions 140 that form a portion of a loop that runs around compass 20 (e.g., on a surface of PCB 90). Perpendicular portions 130 may be configured to couple portion 140 to portions 134 of power return trace 25.

Electric current that flows through portions 140 that form a portion of a circular loop around compass 20 may generate compensating magnetic fields parallel to the z-axis shown in FIG. 15. Compensating magnetic fields parallel to the z-axis may help counter interfering magnetic fields generated by power supply line 24 and/or component 22.

Portions 140 that form a portion of a circular loop around compass 20 may run around compass 20 at a constant distance such as distance 142 from the center of compass 20 (e.g., the radius of partial conductive loop 140 may be equal to distance 142 or loop 140 may be a rectilinear loop around compass 20 at a constant distance from compass 20).

Because magnetic field strength depends on distance from the magnetic field generating source, the strength of a compensating magnetic field at compass 20 due to portion 140 may be determined by the size of distance 142 (e.g., a larger radius 142 results in a smaller compensating magnetic field). Portion 140 of power return trace 25 may be configured to have radius 142 that results in a compensating magnetic field at compass 20 that is substantially opposite to an interfering magnetic field generated by power supply line 24 and component 22.

Figure 16:
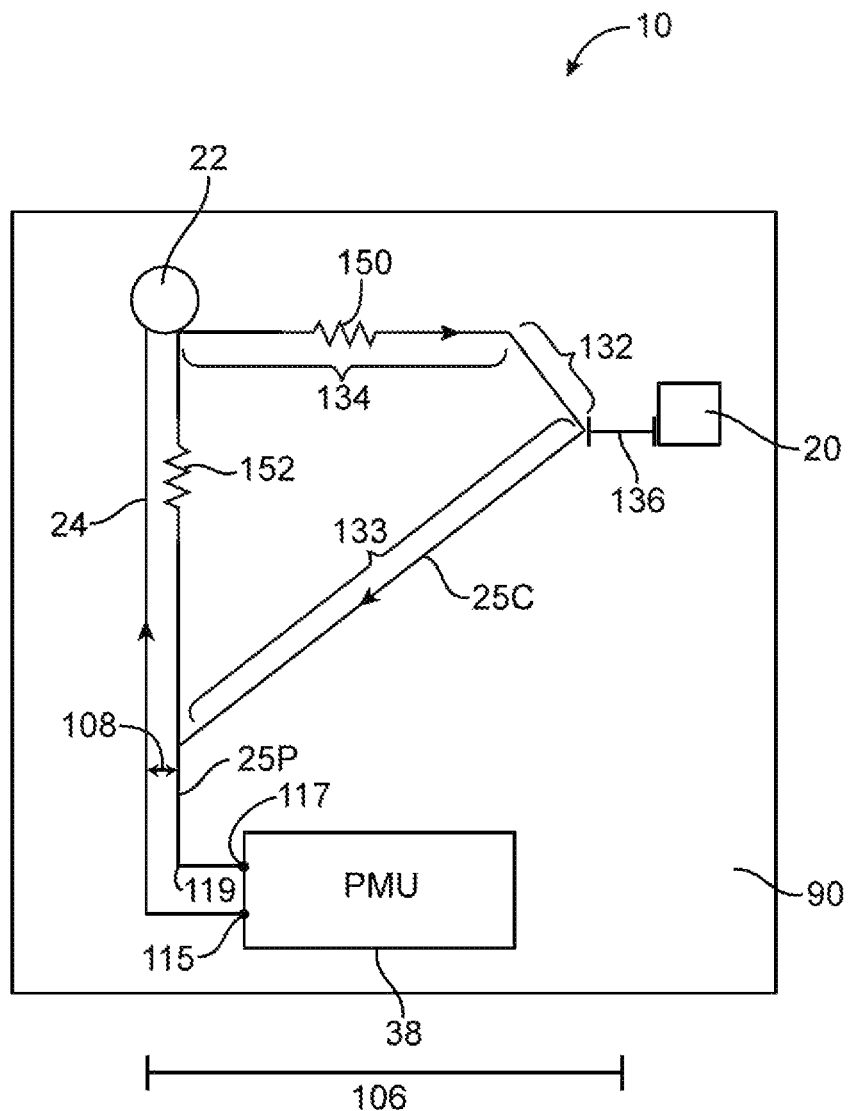
FIG. 16 is a diagram of an illustrative electronic device having a compass, an electronic component with a power supply line, and a power return trace with multiple branches with resistors in accordance with an embodiment of the present invention.

As shown in FIG. 16, a power supply line such as power supply line 24 that supplies electric current from circuitry such as power supply unit 38 to a component such as component 22 may have an associated power return trace such as power return trace 25 that includes a portion that runs parallel to power supply line 24 and a branch that runs in the direction of compass 20.

Power return trace 25 may include a branch such as branch 25P that carries return current from component 22 along a path that runs parallel to power supply line 24. Branch 25P may be coupled to an additional branch 25C of power return trace 25. Branch 25C may be a compensating magnetic field branch for generating compensating magnetic fields that compensate for interfering magnetic fields for compass 20 generated by component 22. Branch 25P may be configured to generate compensating magnetic fields that compensate for interfering magnetic fields generated by current flowing in power supply line 24.

Power return trace 25 may include a portion such as portion 134 that runs perpendicular to power supply line 24 and portions such as portions 132 and 133 that run at angles (e.g., acute angles or obtuse angles) to power supply line 24. Branches 25P and 25C may be implemented using patterned conductive traces on a surface of PCB 90.

Some portions (e.g., portion 132) of power return trace 25C may be shorter than other portions (e.g., portion 133) of return trace 25C. Return trace 25C may be configured to pass at a minimum distance such as minimum distance 136 from compass 20. Minimum distance 136 may be significantly smaller than a minimum distance such as minimum distance 106 between power supply trace 24 and compass 20.

Branch 25C of power return trace 25 may deviate away from a path defined by power supply path 24 toward compass 20.

Power return trace 25D may run alongside power supply trace 24 so that a power return trace 25D and power supply trace 24 have a minimum distance such as distance 108 that is smaller than a distance such as distance 106 from power supply line 24 to a magnetic sensitive component such as compass 20.

Because magnetic field strength depends on distance from the magnetic field generating source, providing PCB 90 with a power return trace 25C having a minimum distance 136 that is smaller than the distance (e.g., distance 106) from power supply line 24 may help generate compensating magnetic fields that compensate for interfering magnetic fields electronic components such as components 22. This is because interfering magnetic fields at compass 20 generated by electronic component 22 may be larger than a compensating magnetic field generated by return trace 25C at the same distance.

The closer proximity of power return trace 25C to compass 20 may result in a magnetic field strength at compass 20 from power return trace 25C relative to a magnetic field strength from power supply trace 24 at compass 20 even if the current flowing in both is the same.

Current flowing through a branch such as branch 25P of power return trace 25 that runs alongside (and parallel to) power supply trace 24 may generate a compensating magnetic field that is substantially equal in magnitude and opposite in direction at compass 20 to an interfering magnetic field generated by current flowing in associated power supply line 24. In this way, branches 25C and 25D of power return trace 25 may help reduce or eliminate magnetic interference for compass 20 from power supply line 25 and component 22.

As shown in FIG. 16, branches 25C and 25P of power return trace 25 may be provided with resistors such as resistors 150 and 152 respectively. Resistors 150 and 152 may have a predetermined or variable resistance. Resistors 150 and 152 may control the relative amount of electric current that flows through branches 25C and 25P of power return trace 25. Providing branches 25C and 25P of power return trace 25 with resistors 150 and 152 respectively may help generate compensating magnetic fields generated by branches 25C and 25P that better compensate for interfering magnetic fields generated by power supply line 24 and component 22 by allowing different respective current levels in branches 25C and 25P.

Figure 17:
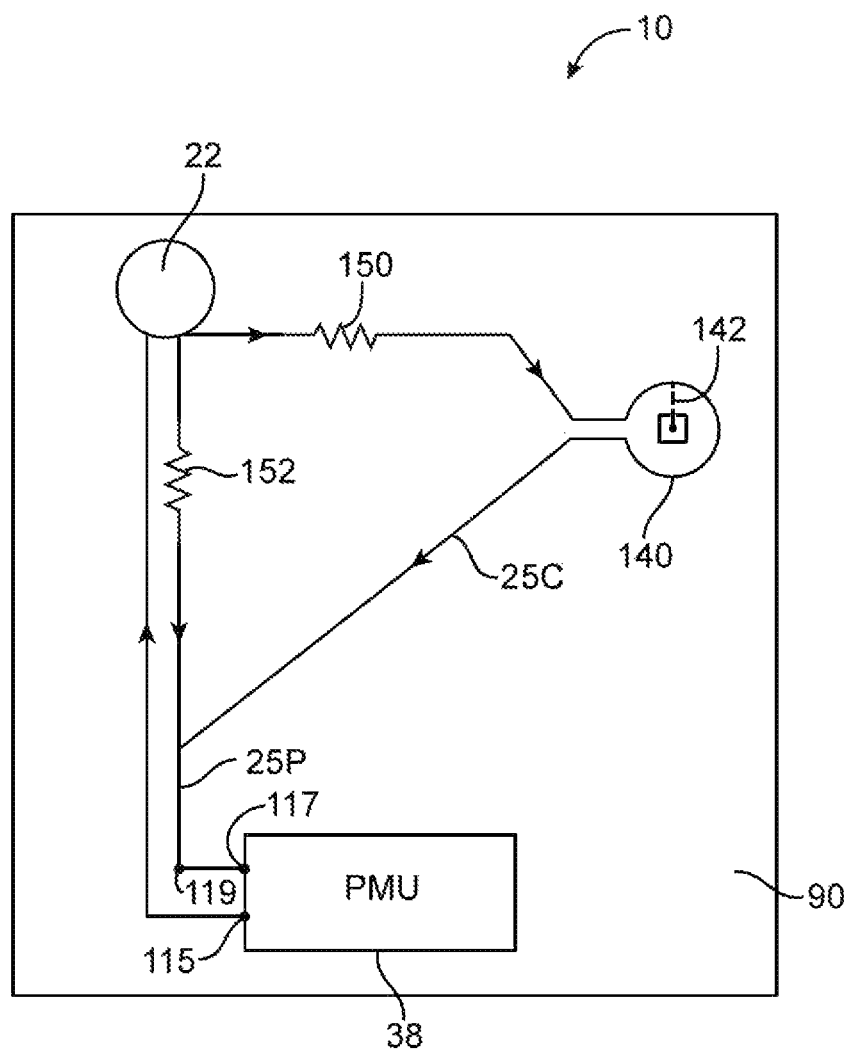
FIG. 17 is a diagram of an illustrative electronic device having a compass, an electronic component with a power supply line, and a power return trace a branche with a resistor that carries electric current around the compass in accordance with an embodiment of the present invention.

If desired, branch 25C of power return trace 25 may include a portion such as portion 140 that runs around a magnetic sensor such as compass 20 as shown in FIG. 17.

As shown in the examples of FIGS. 16, and 17, power supply traces 24 may be coupled to a positive power supply terminal such as terminal 115 of a power source as power management unit 38. Branch 25C may be coupled to branch 25P of power return trace 25. Branches 25P and 25C may electrically couple component 22 to a ground power supply terminal such as terminal 117 or may couple component 22 to a ground conductor through a ground contact such as contact 119.

Portions 140 of branch 25C of power supply line 25 that form a portion of a circular loop around compass 20 may be implemented as patterned conductive traces on PCB 90 that run around compass 20 on a surface of PCB 90 at a constant distance such as distance 142 from the center of compass 20 (e.g., the radius of partial conductive loop 140 may be equal to distance 142).

A compensating magnetic field at compass 20 due to portion 140 may be enhanced using a partial loop such as portion 140 at a predetermined constant distance 142 from compass 20. Portions 140, 132, 133, and 134 of branch 25C may combine with branch 25P (parallel to power supply trace 24) of power return trace 25 to generate a compensating magnetic field at compass 20 that is substantially opposite to an interfering magnetic field generated by power supply line 24 and one or more components such as component 22.

The foregoing is merely illustrative of the principles of this invention and various modifications can be made by those skilled in the art without departing from the scope and spirit of the invention.

What is claimed is:

1. A portable electronic device, comprising:
a printed circuit board;
a compass mounted on the printed circuit board;
at least one conductive power line on the printed circuit board that generates an interfering magnetic field for the compass; and
at least one conductive return line on the printed circuit board that generates a compensating magnetic field that compensates for the interfering magnetic field for the compass.

2. The portable electronic device defined in claim 1 wherein the printed circuit board comprises opposing first and second sides, wherein the at least one conductive power line and the at least one conductive return line are formed on the first side, and wherein at least a portion of the at least one conductive return line is parallel to the at least one conductive power line.

3. The portable electronic device defined in claim 2, further comprising an electronic component coupled to the at least one conductive power line and the at least one conductive return line.

4. The portable electronic device defined in claim 1 wherein the printed circuit board comprises opposing first and second sides, wherein the at least one conductive power line is formed on the first side, wherein at least a portion of the at least one conductive return line is formed on the second side parallel to the at least one conductive power line.

5. The portable electronic device defined in claim 4, further comprising an electronic component configured to receive power from the at least one conductive power line and the at least one conductive return line.

6. The portable electronic device defined in claim 5, further comprising at least one conductive via in the printed circuit board that extends from the first side to the second side, wherein the at least one conductive via electrically couples the electronic component to the at least one conductive return line on the second side.

7. The portable electronic device defined in claim 6, further comprising a conductive ground plane on the second side that is coupled to the at least a portion of the at least one conductive return line on the second side.

8. The portable electronic device defined in claim 1 wherein the at least one conductive power line has a minimum distance from the compass and a maximum distance from the at least one conductive return line, and wherein the maximum distance is smaller than the minimum distance.

9. A portable electronic device, comprising:
a printed circuit board;
a compass mounted on the printed circuit board; and
first and second conductive power lines mounted on the printed circuit board on opposing sides of the compass, wherein the first and second conductive power lines are separated from the compass by a common minimum lateral distance.

10. The portable electronic device defined in claim 9, further comprising power supply circuitry, wherein the first and second conductive power lines comprise first and second branches of a common conductive power path that is coupled to the power supply circuitry.

11. The portable electronic device defined in claim 10, further comprising a conductive ground plane, wherein the printed circuit board comprises opposing first and second sides, wherein the conductive ground plane is formed on the second side, and wherein the conductive power path is formed on the first side.

12. The portable electronic device defined in claim 9 wherein the printed circuit board comprises opposing first and second sides, wherein the first and second conductive power lines are formed on the first side, wherein the first conductive power line is separated from the compass by the common minimum distance, and wherein the second conductive power line is separated from the compass by the common minimum distance, the electronic device further comprising:
    a first conductive return line parallel to the first conductive supply line; and
    a second conductive return line parallel to the second conductive supply line, wherein the first and second conductive return lines are formed on the second side.

13. A portable electronic device, comprising:
    a printed circuit board;
    a compass mounted on the printed circuit board;
    an electronic component on the printed circuit board;
    power supply circuitry on the printed circuit board;
    a first conductive line on the printed circuit board that extends along a path between the power supply circuitry and the electronic component; and
    a second conductive line on the printed circuit board that is coupled between the power supply circuitry and the electronic component, wherein power is distributed from the power supply circuitry to the electronic component using the first and second conductive lines, wherein the electronic component generates an interfering magnetic field for the compass during operation of the electronic component, and wherein at least a portion of the second conductive line deviates away from the path towards the compass so that the second conductive line generates a compensating magnetic field that compensates for the interfering magnetic field.

14. The portable electronic device defined in claim 13 wherein the second conductive line comprises a first portion that is parallel to the first conductive line, a second portion that is perpendicular to the first conductive line, and at least one portion that is formed at an acute angle with respect to the first conductive line.

15. The portable electronic device defined in claim 13 wherein the compass is mounted on a surface of the printed circuit board, wherein the second conductive line is formed on the surface, and wherein the portion of the second conductive line comprises a portion of a circular loop that runs around the compass on the surface of the printed circuit board.

16. The portable electronic device defined in claim 13 wherein the portion of the second conductive line comprises a branch of the second conductive line having a resistor, wherein the second conductive line comprises an additional branch coupled to the branch, wherein the additional branch has an additional resistor, and wherein at least a portion of the additional branch is parallel to the first conductive line.

17. The portable electronic device defined in claim 16 wherein the compass is mounted on a surface of the printed circuit board, wherein the second conductive line is formed on the surface of the printed circuit board, and wherein the branch of the second conductive line comprises a portion of a circular loop that runs around the compass on the surface of the printed circuit board.

18. The portable electronic device defined in claim 13, further comprising power supply circuitry having a positive terminal coupled to the first conductive line.

19. The portable electronic device defined in claim 18 wherein the electronic component comprises a camera having a lens, at least one fixed magnet, and a wire coil, wherein an electric current that flows through the wire coil and the first conductive line generates the interfering magnetic field, and wherein the power supply circuitry is configured to change the electric current to move the lens.

20. The portable electronic device defined in claim 13 wherein the electronic component comprises a light source, wherein an electric current that flows through the first conductive line and the second conductive line generates the interfering magnetic field and the compensating magnetic field respectively, and wherein the power supply circuitry is configured to control the electric current to operate the light source.

21. A portable electronic device comprising
    a printed circuit board having at least one layer with opposing first and second sides;
    a compass mounted on the first side of the layer; and
    a conductive ground plane on the second side of the layer having a recess under the compass.

* * * * *